US006539422B1

(12) United States Patent
Hunt et al.

(10) Patent No.: US 6,539,422 B1
(45) Date of Patent: Mar. 25, 2003

(54) AUTOMATIC DATA COLLECTION DEVICE HAVING A NETWORK COMMUNICATIONS CAPABILITY

(75) Inventors: Jeffrey M. Hunt, Everett, WA (US); Jon R. Ramberg, Lynnwood, WA (US); Paul D. Shoeman, Lynnwood, WA (US); James T. Katsandres, Seattle, WA (US)

(73) Assignee: Intermec IP Corp., Beverly Hills, CA (US)

( * ) Notice: Subject to any disclaimer, the term of this patent is extended or adjusted under 35 U.S.C. 154(b) by 0 days.

(21) Appl. No.: 09/304,217

(22) Filed: May 3, 1999

Related U.S. Application Data

(60) Provisional application No. 60/084,272, filed on May 4, 1998.

(51) Int. Cl.[7] .............................................. G06F 15/16
(52) U.S. Cl. ...................... 709/217; 709/202; 709/203; 709/230
(58) Field of Search ................................. 709/217, 203, 709/202, 218, 230; 707/10, 104

(56) References Cited

U.S. PATENT DOCUMENTS

| | | | | |
|---|---|---|---|---|
| 4,801,786 A | 1/1989 | Stobbe | ........................ | 235/377 |
| 4,825,058 A | 4/1989 | Poland | ........................ | 235/472 |
| 5,034,598 A | 7/1991 | Poland | ........................ | 235/435 |
| 5,052,020 A | 9/1991 | Koenck et al. | ................ | 375/62 |
| 5,070,536 A | 12/1991 | Mahany et al. | ................ | 455/67 |
| 5,121,342 A | 6/1992 | Szymborski et al. | ........ | 364/514 |

(List continued on next page.)

FOREIGN PATENT DOCUMENTS

WO WO 97/26750 7/1997

OTHER PUBLICATIONS

Preston, "Internet Protocols Migrate To Silicon For Networking Device", *Electronic Design*, vol. 45, No. 8 Apr. 14, 1997, pp. 87–90, 92–94.

Jander, "Welcome to the Revolution", *Data Communications*, vol. 25, No. 16., Nov. 21, 1996, pp. 39–41, 44, 46, 48, 50, 52–53.

Susilo et al., "Infrastructure for Advanced Network Mangement based on Mobile Code", 1998 IEEE Network Operations and Managment Symposium, New Orleans, LA, Feb. 15–20, 1998, vol. 2, No. Conf, 10, pp. 322–333.

Palmer, Roger C., *The Bar Code Book*, Helmers Publishing Inc., Peterborough, New Hampshire, 1989, p. 107.

*Primary Examiner*—Mehmet B. Geckil
(74) *Attorney, Agent, or Firm*—Seed IP Law Group PLLC

(57) ABSTRACT

The invention provides a system and method for controlling a plurality of automatic data collection (ADC) device platforms. In the invention, a remote computing system having browsing software adapted for receiving and sending Hypertext Markup Language (HTML) documents, Dynamic Hypertext Mark-Up Language (DHTML) documents, and Exstensible Mark Up Language (XML) documents over the World Wide Web communicates with a network of ADC platform devices. A Simple Network Management Protocol (SNMP) master agent at the ADC device platform communicates with the remote computing system and a Hypertext Transfer Protocol (HTTP) server sends HTML documents, DHTML documents, and XML documents to the remote computing system over the World Wide Web. A translator translates SNMP-formatted data sent to the attached ADC devices into a format suitable for reception by each ADC device. Another translator translates data received from the ADC devices into the SNMP format. The SNMP master agent communicates with the remote computing system using the TCP protocol, the UDP/IP protocol, and the UDP+ protocol. The ADC platform device may utilize a wireless communications system for communicating with the remote computing system.

6 Claims, 17 Drawing Sheets

U.S. PATENT DOCUMENTS

| | | | |
|---|---|---|---|
| 5,218,188 A | 6/1993 | Hanson | 235/375 |
| 5,261,079 A | 11/1993 | Celi, Jr. | 395/500 |
| 5,295,154 A | 3/1994 | Meier et al. | 371/1 |
| 5,309,352 A | 5/1994 | McCain et al. | 364/132 |
| 5,322,991 A | 6/1994 | Hanson | 235/472 |
| 5,349,678 A | 9/1994 | Morris et al. | 395/800 |
| 5,365,546 A | 11/1994 | Koenck et al. | 375/9 |
| 5,404,493 A | 4/1995 | Bolme et al. | 395/500 |
| 5,418,684 A | 5/1995 | Koenck et al. | 361/680 |
| 5,425,051 A | 6/1995 | Mahany | 375/202 |
| 5,440,564 A | 8/1995 | Ovadia et al. | 370/112 |
| 5,471,596 A | 11/1995 | Brown, III | 395/375 |
| 5,572,512 A | 11/1996 | Cutler, Jr. et al. | 370/13 |
| 5,577,229 A | 11/1996 | Wakerly | 395/474 |
| 5,586,281 A | 12/1996 | Miyama et al. | 345/405 |
| 5,604,516 A | 2/1997 | Herrod et al. | 345/168 |
| 5,623,603 A | 4/1997 | Jiang et al. | 395/200.04 |
| 5,979,757 A * | 11/1999 | Tracy et al. | 235/383 |
| 5,999,948 A * | 12/1999 | Nelson et al. | 707/506 |
| 6,027,024 A * | 2/2000 | Knowles | 235/462.01 |
| 6,073,169 A * | 6/2000 | Shuey et al. | 340/870.02 |
| 6,178,426 B1 * | 1/2001 | Klein et al. | 707/102 |
| 6,199,753 B1 * | 3/2001 | Tracy et al. | 235/375 |
| 6,243,105 B1 * | 6/2001 | Hoyer et al. | 345/418 |
| 6,308,205 B1 * | 10/2001 | Carcerano et al. | 709/220 |
| 6,321,991 B1 * | 11/2001 | Knowles | 235/375 |
| 6,321,992 B1 * | 11/2001 | Knowles et al. | 1/1 |

\* cited by examiner

| | |
|---|---|
| Raptor Applications<br>(Intermec and User Developed) *1609* | Application *1601* |
| Winsock 1.1 API *1610*<br>Plus Additions for Legacy Applications | Presentation *1602* |
| | Session *1603* |

| Terminal Message Format (TMF) UDP+ *515* | Trivial File Transfer Protocol (TFTP) *1611* | SNMP Master Agent *210* | | | |
|---|---|---|---|---|---|
| | | TCP *1612* | | | Transport *1604* |
| | UDP *1613* | | | | |
| (UDP/IP) *1614* | IP, ICMP, and ARP *1615* | | | | Network *1605* |
| Possibly NDIS 4.0 *1617* | NDIS 4.0 *1616* | | PPP *1621* | | Data Link *1607* |
| Legacy Radio Driver (possibly NDIS) *1618* | Open Radio I/F Protocol Driver (NDIS Compliant) *1619* | Ethernet Driver *1620* | Windows CE Built-in Serial Port Driver (In OAL) *1622* | | |
| | Windows CE OEM Adaptation Layer (OAL) *1623* | | | | |
| Legacy Radio Interfaces *1624* | Open Radio Hardware Interfaces (e.g., NE2000) *1625* | Ethernet Controller *1626* | Serail Port (COM1) *1627* | | Physical *1608* |

*FIG. 16*

AUTOMATIC DATA COLLECTION DEVICE HAVING A NETWORK COMMUNICATIONS CAPABILITY

CROSS REFERENCE TO RELATED APPLICATION

This application is a non-provisional application claiming priority from U.S. Provisional Patent Application No. 60/084,272 filed May 4, 1998.

TECHNICAL FIELD

The invention relates generally to automatic data collection (ADC) devices and more particularly to communication protocols providing remote access to a network of such devices.

BACKGROUND OF THE INVENTION

Automatic data collection (ADC) device platforms, such as hand-held devices equipped with bar code readers, have received increasing commercial attention in the past few years. ADC device platforms, such as hand-held data collection terminals, or hand-held personal computers, have been widely implemented in the retail marketplace and have garnered increasing utilization in a diverse range of application areas. The ever-decreasing cost and size of ADC device platforms has facilitated their entry into a wide variety of commercial, institutional, and governmental settings.

A hand-held device having a bar code reader adeptly accesses and retrieves data stored in the form of a bar code label. Data representing virtually any product or service found in the marketplace may be encoded in a bar code label for later access by a hand-held device having a bar code reader. For these reasons, hand-held devices are now actively used for planning, controlling, producing, and analyzing most aspects of commerce. Bar code readers include laser scanners as well as other means of collecting product information, such as a bar code wand, still camera or area imager. In addition to bar code labels, other ADC data formats include radio frequency ("RF") tags, magnetic strips, optical character recognition ("OCR"), speech input, and any symbol having encoded data therein.

In a conventional ADC device platform environment, the recipient of ADC data either physically manipulates the ADC device platform itself to retrieve the ADC data or receives the ADC data through a local, and probably proprietary, network. Thus, a typical ADC device operator is limited both in terms of the distance from which the operator may be located away from the actual device and by the complexity and versatility of the components that comprise the ADC device network which the operator utilizes. The operator suffers from still further limitations due to the fact that many conventional ADC device platforms are not readily configurable for new ADC devices, or even for ADC devices other than those attached to the ADC device platform when it is initially sold. Yet another limitation in a conventional ADC device platform arises when an operator wishes to add a new ADC device to one of the few ADC device platforms that will accept new ADC devices. This limitation stems from the fact that many ADC devices operate using proprietary communications protocols, and even when the communications protocols are non-proprietary, the communications protocols are typically non-standard. Thus, the operator cannot simply attach a new ADC device to an existing ADC device platform and expect that the new combination will function properly. The operator typically must either return the device to the manufacturer for re-fitting with the new ADC device or request that a service representative of the new ADC device's manufacturer visit the operator's location and perform the installation on site.

SUMMARY OF THE INVENTION

The invention provides a method and system for remotely controlling the operations of a plurality of networked Automatic Data Collection (ADC) device platforms. Each ADC device platform in the plurality of networked ADC device platforms contains an ADC device server. The ADC device server connects to a communications network that may be remotely accessed by an ADC device operator. The remote ADC device operator sends commands for controlling the ADC device over the communications network and through the server to the ADC device. Commands passing over the communications network to the ADC data server may arrive at the ADC device platform in a communications format different from the format required by the ADC devices connected to the ADC device platform. Various subsystems on the ADC device platform translate information passing within the ADC device platform as well as the external connections.

Embodiments of the invention provide a system for controlling a plurality of hand-held devices having at least one ADC reader. A Hypertext Transfer Protocol (HTTP) server on the hand-held device receives document queries from a web browser on a remote computing system and sends Hypertext Mark-Up Language (HTML) documents, Dynamic Hypertext Mark-Up Language (DHTML) documents, Exstensible Mark Up Language (XML) documents, and/or documents in other data formats to the remote computing system over the World Wide Web. The remote computing system uses the HTML documents, DHTML documents, and/or XML documents to control the hand-held device. In each hand-held device of the plurality of hand-held devices, a Simple Network Management Protocol (SNMP) master agent communicates with the remote computing system. An SNMP subagent translates SNMP-formatted information sent from the SNMP master agent to the ADC reader into a format suitable for reception by the ADC reader. The SNMP subagent translates data received from the ADC reader into the SNMP format for transmission to the remote computing system.

BRIEF DESCRIPTION OF THE DRAWINGS

Note that similar elements and steps in the figures have the same reference number.

FIG. 16 displays the ADC device platform's communication protocol stack.

DETAILED DESCRIPTION OF THE INVENTION

Figure 1:
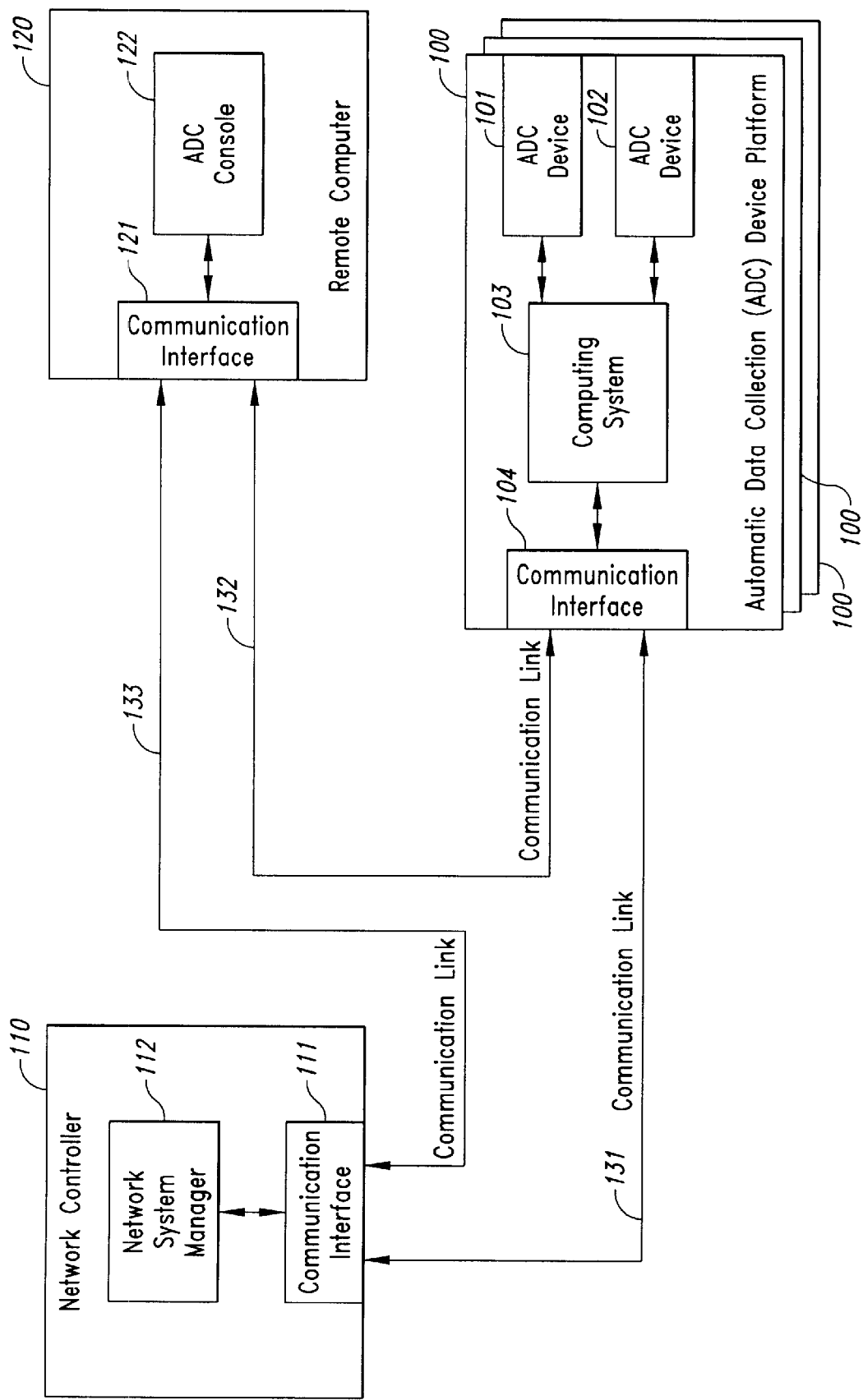
FIG. 1 depicts the system management architecture for a network of ADC device platforms.

Aspects of the invention provides a system and method for controlling a plurality of automatic data collection (ADC) device platforms. The invention is particularly applicable to instrumented hand-held devices, including ADC device platforms, but is also applicable to other computing systems as well. Under aspects of the invention, a remote computing system having browsing software receives Hypertext Markup Language (HTML) documents, Dynamic Hypertext Mark-Up Language (DHTML) documents, Exstensible Mark Up Language (XML) documents, and/or other documents containing ADC device computing applications over the World Wide Web. The remote computing system uses these ADC device computing applications to communicate with a network of ADC platform devices. A Simple Network Management Protocol (SNMP) master agent on the ADC device platform communicates with the remote computing system, and a translator translates SNMP-formatted data sent to the ADC device platform into a format suitable for reception by its ADC devices. Another translator translates data received from the ADC device into the SNMP format for transmission to the remote computing system. The SNMP master agent communicates with the remote computing system using the Transmission Control Protocol (TCP), the User Datagram Protocol/Internet Protocol (UDP/IP), or the User Datagram Plus Protocol (UDP+). While the SNMP protocol specifies that it uses UDP, a variant of the SNMP protocol may be used with TCP. The User Datagram Plus Protocol (UDP+) is further described in U.S. application Ser. No. 08/852,002, entitled, "Reliable Communication over an Unreliable Transport Layer in a Hand-Held Device using User-Configurable Timers," filed on May 6, 1997 and assigned to a common assignee, which is hereby incorporated by reference. The User Datagram Plus Protocol (UDP+) is also described in U.S. application Ser. No. 08/851,848, "Providing Reliable Communication over an Unreliable Transport Layer in a Hand-Held Device using a Persistent Session," filed on May 6, 1997 and assigned to a common assignee, which is hereby incorporated by reference. The ADC platform device may also utilize a wireless communications system for all or a portion of its communications with the remote computing system.

Embodiments of the invention provide a system management architecture that uses Internet technology to deliver system management functions to a remote ADC device operator and uses the SNMP for communication with ADC device platforms. The ADC device network is scaleable from a minimal system having a few ADC device platforms to a large system with hundreds of ADC device platforms connected in a network. The minimal system requires only a low-cost personal computer (PC) based web browser, while the larger system may utilize an existing SNMP infrastructure having a mixture of ADC devices.

According to one embodiment of the invention, this system management architecture uses Java applets as the user interface and SNMP to communicate configuration and control requests to ADC device platforms. Java is an object-oriented programming language similar to C++. Java was designed to be secure and platform neutral, meaning that Java code may run on any computing platform. Java is a useful language for programming applications for the World Wide Web since users access the web from many different types of computers. Java is especially well adapted for use in programming small applications, or applets, for use in the World Wide Web. A Java applet may be loaded and run by an already running Java application, such as a web browser. Java applets may be downloaded and run by any web browser capable of interpreting Java, such as Microsoft Internet Explorer, Netscape Navigator, and Hot Java.

FIG. 1 depicts the system management architecture for a network of ADC device platforms 100. The ADC device platform network comprises a network controller 110, a remote computing system 120, and one or more ADC device platforms 100. The network controller 110 includes a communication interface 111 and a network system manager 112. The remote computing system 120 includes a communication interface 121 and an ADC console 122. The ADC device platform 100 includes a communications interface 104, a computing system 103 and ADC devices 101 and 102. The ADC platform 100 is not limited to just two ADC devices, and may have only one device. The ADC devices 101 and 102 may include, for example, bar code readers, radio frequency (RF) tag readers, SmartCard readers, magnetic stripe readers, optical character recognition ("OCR") readers, speech input recognizing devices, and all forms of scanning or imaging devices. An exemplary RF tag reader suitable for use in the ADC device platform 100 is described in U.S. application Ser. No. 09/067,339 entitled, "Automatic Mode Detection and Conversion System for Printers and Tag Interrogators," filed on Apr. 27, 1998 and assigned to a common assignee, which is hereby incorporated by reference.

Using the ADC console 122, a remote operator sends commands to the ADC devices 101 and 102 through a communication link 132. Communications from the remote computing system 120 arrive at the ADC devices 101 and 102 via the computer system 103 on the ADC platform 100.

In a similar manner, data collected by the ADC devices 101 and 102 may be transferred to the remote computing system 120 via the computing system 103.

The remote computing system 120 also communicates with the network controller 110 through a communication link 133. This connection allows the remote computing system 120 to communicate with both the network controller 110 and the ADC device platform 100. The network controller 110 may communicate directly with the ADC device platform 100 through a communication link 131. Using the communication link 131, the network controller 110 may alter device parameters and settings on the ADC platform 100, as described below.

Using the architecture shown in FIG. 1, the remote operator at the remote computing system 120 may receive data from either of the ADC devices 101 or 102, or from both devices simultaneously. This system architecture also allows the network operator to control characteristics of the ADC platform 100 and any configurable subsystems on the ADC platform 100.

Figure 2:
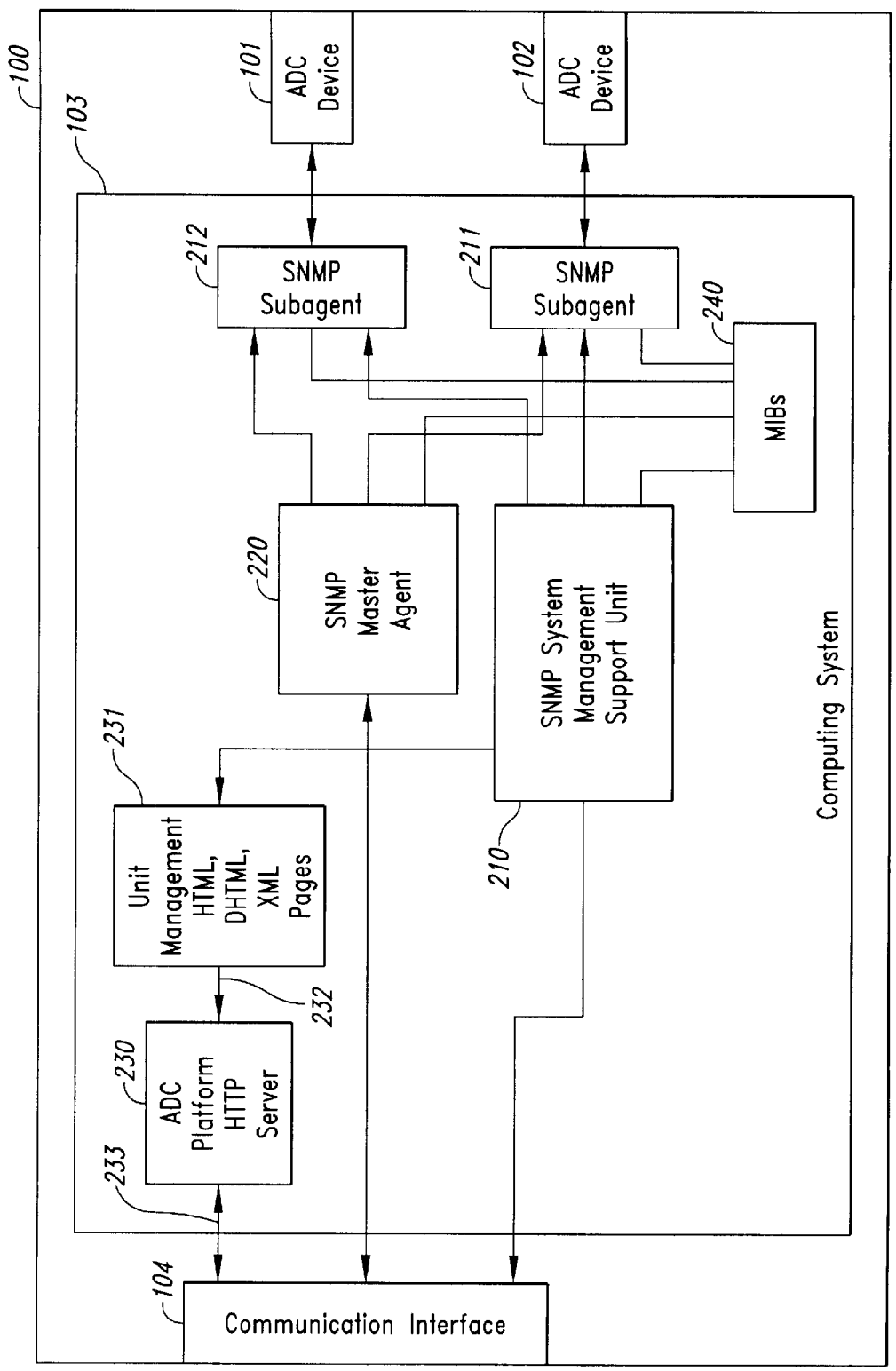
FIG. 2 provides a more detailed illustration of the network communications systems utilized by the computing system 103 of the ADC device platform 100 shown in FIG. 1.

FIG. 2 provides a more detailed illustration of the network communications systems utilized by the computing system 103 of the ADC device platform 100. The ADC device platform 100 utilizes the Simple Network Management Protocol (SNMP) for network management. In an embodiment of the invention, an SNMP management platform controls and configures all ADC device platform devices. SNMP has recently become a well-favored network management protocol. SNMP utilizes a fetch-store paradigm in which agents (servers) maintain a set of management information such as statistics, status, and configuration values in a Management Information Base (MIB). The elements of a network management architecture in an SNMP manager/agent model consists of a manager, a managed system (the ADC device platform), a database of management information and a network protocol. The manager provides the user interface between the human network manager and the managed devices. Between the remote user and an ADC device platform, the user interface is a Graphical User Interface (GUI) running locally or remotely, according to one embodiment of the invention.

FIG. 2 depicts an exemplary embodiment of the invention, in which the SNMP management platform utilizes three interface categories: an SNMP system management support unit 210, an SNMP master agent 220 and SNMP subagents such as SNMP subagents 211, 212. The SNMP management support unit 210 performs SNMP requests such as those that will be provided by a Java applet or application. The SNMP master agent 220 performs SNMP packet verification while the SNMP subagents 211, 212 perform the actual sending and retrieving of information from the ADC devices 101, 102. This design aids ADC device platform manufacturers and their value-added resellers by simplifying the addition of new ADC devices. The SNMP subagents 211, 212 provide a consistent interface between the SNMP master agent 220 and the ADC devices 101, 102. The SNMP master agent 220 interface, when used with TCP/IP, is fully compliant with the RFC 1157 that articulates a standard for the SNMP protocol. Such compliance allows the SNMP master agent 220 to operate with all SNMP compliant management software.

The SNMP master agent 220 communicates with the network controller 110 using SNMP. SNMP is the network management protocol of the Transmission Control Protocol/Internet Protocol TCP/IP. Using SNMP, agents, such as the SNMP master agent 220, monitor the activity in various devices on the network and report the activity to a network console such as the network controller 110.

A Management Information Base (MIB) describes or provides management information for SNMP devices. The MIB describes a set of objects to SNMP devices and provides information about each object, including its structure, its relationship to other objects, and the operations allowed on the object. The MIB essentially tells SNMP what pieces of information it can modify or view on the ADC device platform 100. Configuration, control, and statistics data particular to the ADC device platform 100 are described in the ADC device platform MIB. In addition to supporting the ADC device platform MIB, a MIB 240 on ADC device platform 100 also supports MIBs for: a MIB-II (RFC 1213), an Intermec Reader MIB, an Intermec UDP+ MIB, an Proxim WLIF Radio MIB, a Scorpion 900 MHz Radio MIB, and a 802.11 MIB (IEEE P802.11), and other protocols, especially RF readable tag protocols, according to an embodiment of the invention.

For example, control information about each ADC device 101, 102 is maintained in the MIB 240. The SNMP master agent 220 controls SNMP subagents 211 and 212. These two SNMP subagents 211 and 212 respectively interface with the ADC devices 101 and 102. The ADC devices 101 and 102 may each operate under a different communications protocol or system. As described above, the ADC device platform 100 may be equipped with a wide variety of ADC device types, such as bar code readers and RF tag readers. Each of these exemplary ADC devices may operate under different protocols, and the MIB 240 includes information related to these protocols, according to an exemplary embodiment of the invention. The SNMP subagents 211 and 212 translate between the communications protocol of ADC devices 101 and 102 and the standardized SNMP protocol using information from the MIB 240. Adding a new ADC device to the ADC device platform 100 requires only adding a new SNMP subagent and storing relevant information in the MIB 240, regardless of the new ADC device's communication protocol.

A manager (client) accesses information in the MIB 240 using three operations: Get, Get-Next, and Set. "Get" allows a manager to retrieve the value of an object. "Get-Next" allows a manager to retrieve the value of the next object instance in a data store without necessarily knowing the name of the object. "Set" allows a manager to change the value of one or more object.

Both remotely operated SNMP management applets and locally operated SNMP applications use management interfaces that provide a mechanism for performing SNMP "Get" and "Set" operations for retrieving and modifying information in a network node, such as the ADC device platform 100. SNMP "Set" requests change one or more values of a MIB object in the MIB 240. If an invalid value is given, an error is returned and none of the changes take effect. Changes may otherwise take effect immediately or after the ADC device platform 100 is reinitialized, depending on the variable. The "Set" request returns "success" only when all the changes have been applied successfully. SNMP "Get" request retrieves one or more MIB item values. The SNMP "GetNext" request retrieves one or more MIB object values in the MIB 240. Upon receipt of a "GetNext" request, the SNMP master agent 220 retrieves the next MIB entry based on the object identifier provided for each OID in the received list. If the "Get" or "GetNext" requests provide an invalid OID or community name, an error is returned. The "Set," "Get" and "Get-Next" requests may receive input from the remote computing system 120 and format an SNMP packet to be delivered to the ADC device platform SNMP master agent 220.

SNMP also provides traps, or an unacknowledged message, sent asynchronously from the SNMP master agent 220 and subagents 211, 212 to the SNMP management support unit 210 to notify the SNMP management support unit 210 of an exception condition. SNMP traps allow the SNMP management support unit 210 to discover anomalous situations that might require intervention. SNMP primarily uses polling to gather information about a network node, such as the ADC platform 100, which produces traps that alert the management support unit 210 that additional polling is necessary. Since traps are unacknowledged, they cannot be used to replace SNMP polling.

In one embodiment of the invention, SNMP provides the network protocol and utilizes a UDP transport within an IP communications stack. In some ebmodiments of the invention, UDP may be bundled with TCP in the communications stack, while in other embodiments UDP is not bundled with TCP in the communications stack. Since the ADC device platform 100 uses SNMP, the ADC device platform 100 may be managed anywhere on an SNMP-enabled network via an SNMP management station such as HP Openview or IBM's NetView. This embodiment also provides a Java web browser interface to allow a remote operator to manage a single ADC device platform 100 from anywhere on the network. The embodiment further provides a Java applet provided by the network controller 110 that performs system management functions for all ADC device platforms 100 in the network. This applet may include a graphical user interface (GUI) that operates from both the network controller 110 and from a web browser on the remote computing system 120.

A network system manager may perform file transfers, view files, provide firmware upgrades and review graphically-represented unit performance statistics via the World Wide Web. The network system manger may view a map of all ADC device platforms 100 on the network and their current status. Java applets perform SNMP requests to a ADC device platform 100 to gather and modify device data. The Java applets include a security authentication module that varies from user to user based on a security profile. Depending on their individual security profiles, different users may have different capabilities.

For ADC device platforms 100 without a TCP/IP stack loaded (e.g., a platform using the 900 MHz protocol), the remote network controller 110 serves as an SNMP proxy. The remote network controller 110 receives the SNMP commands and sends them to the ADC device platform 100 using the 900 MHz protocol and an appropriate reader command language.

The SNMP system management support unit 210 also provides support for the Trivial File Transfer Protocol (TFTP), application installation, and FLASH memory upgrades. Thus, using the system management support unit 210, a new SNMP subagent could be added to the computing system 103 or an update can be performed on an existing SNMP subagent, such as the SNMP subagent 211. The system management support unit 210 communicates with the remote computing system 120 using sockets, TCP, UDP, and UDP+. Sockets provide an identifier for a particular service on a particular node of a network. The socket consists of a node address and a port number that identifies the service. TCP governs the break up of data messages into packets to be sent via the Internet Protocol (IP) and the reassembly and verification of the complete messages from packets received. UDP is a connectionless protocol parallel to TCP in the IP communication stack. UDP converts data messages generated by an application into packets to be sent via IP but does not verify that the messages have been delivered correctly. Therefore, UDP is more efficient than TCP, although the reliability of UDP depends on the application generating the message. UDP+ provides additional functionality that is not provided by UDP, such as guaranteed packet delivery and packet ordering.

The system management unit 210 also provides upgrades to unit management HTML, DHTML, and/or XML pages 231. The unit management HTML, DHTML, and/or XML pages 231 may be accessed by an ADC platform HTTP server 230. HTML, or the Hypertext Markup Language, is a client/server protocol that provides documents for use on the World Wide Web. HTML uses tags to mark elements, such as text and graphics, in a document to indicate how web browsers should display the elements to the user and to indicate how the web browser should respond to user actions, such as an activation of a link by means of a key press or mouse click. The unit management HTML, DHTML, and/or XML pages 231 also contain Java applets for controlling different elements within the ADC platform device 100. DHTML provides the same capabilities as HTML but adds a capability for a Dynamic User Interface without requiring the web browser to query the HTTP server computer. XML provides a data standard that can encode the content, semantics, and schemata for a gamut of cases, from simple to complex. XML can encode the representation for: an ordinary document; a structured record, such as an appointment record or purchase order; an object, with its data and methods such as the persistent form of a Java object or an ActiveX™ control; a data record, such as the result set of a query; metacontent about a World Wide Web site, such as Channel Definition Format (CDF) information; graphical presentations such as an application's user interface, and standard schema entities and types. In essence, XML may be used for encoding all the links between information and people on the World Wide Web.

Using the unit management HTML, DHTML, and/or XML pages 231, the ADC platform HTTP server 230 provides information and applets, or small application programs, to the remote computing system 120, allowing a remote operator to control the ADC device platform 100 and to receive data from an ADC device, such as the ADC device 102. The HTML, DHTML, and/or XML pages 231 located on the ADC platform device 100 reference unit management Java applets. Referencing a Java applet in an HTML page provides the mechanism for addressing that applet.

Figure 3:
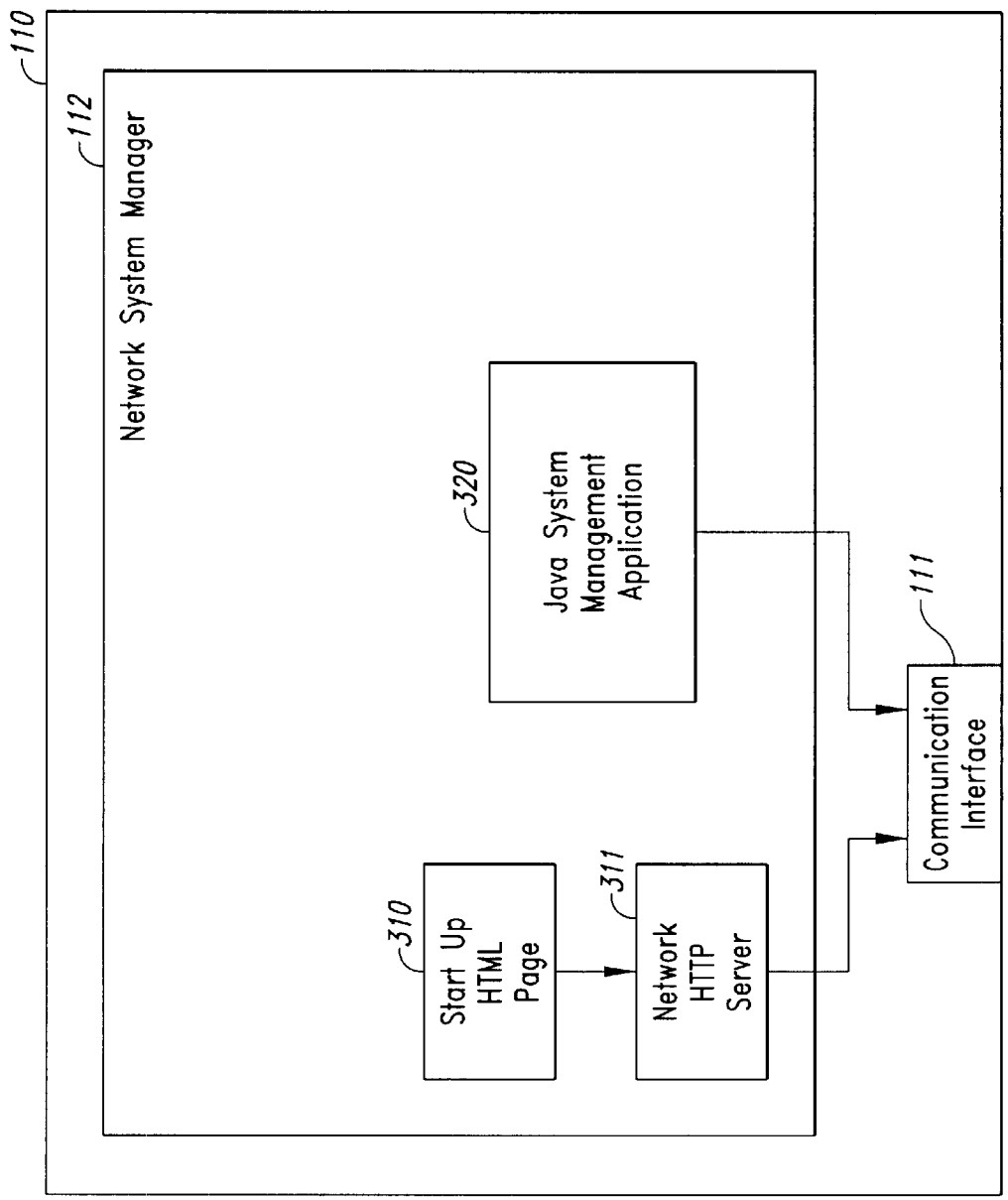
FIG. 3 provides more detail of the system manager 112 in the network controller 110 shown in FIG. 1.

FIG. 3 provides more detail of the network system manager 112 in the network controller 110. The system manager 112 includes a start up HTML page 310 that provides data to a network HTTP server 311. The start up HTML page 310 loads the initial system management information and related Java applets for transmission to the remote computing system 120. The network system manager 112 also includes a Java system management application 320 that communicates with the SNMP master agent 220 on the ADC device platform 100. The Java system management application 320 also communicates with the remote computing system 120. Java applets provided by the network system management 112 may be used for controlling various characteristics on one or more ADC device platforms 100.

Figure 4:
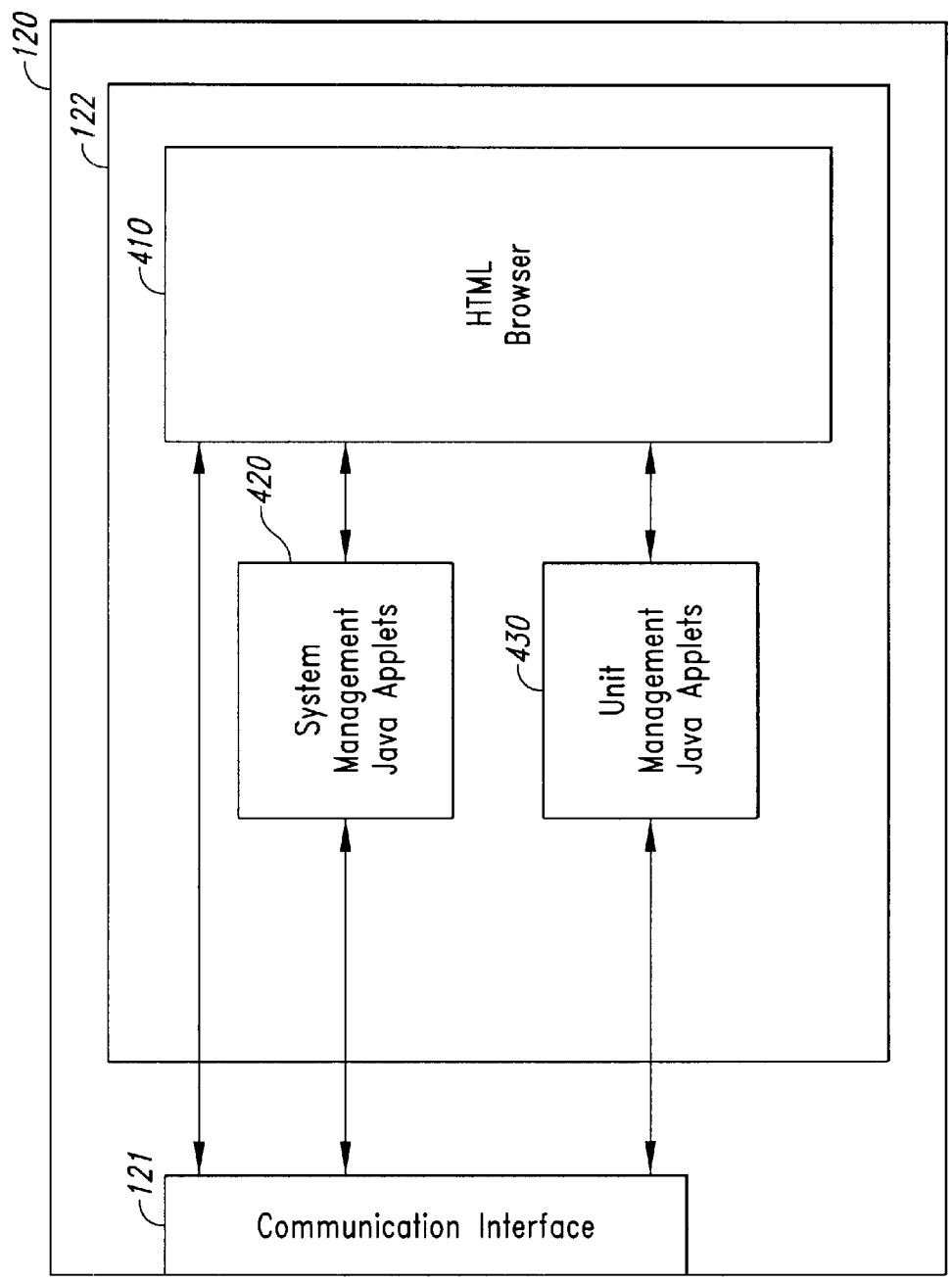
FIG. 4 provides more detail of the ADC console 122 shown in FIG. 1.

FIG. 4 provides more detail on the ADC console 122 in the remote computing system 120. The ADC console 122 includes a remote HTML browser 410, system management Java applets 420 and unit management Java applets 430. The remote HTML browser 410 runs on any remote ADC console 122 such as a Windows95-equipped personal computer (PC), a UNIX workstation, an IBM host computer, or a WindowsCE equipped hand-held computer. The remote HTML browser 410 hosts the Java applets that provide the system management user interface and device communications. For example, the remote HTML browser 410 receives data from the network HTTP server 311. The system management Java applets 420 receive information from the Java system management application 320 through Java RMI sockets and CORBA. Java RMI, or Java Remote Method Invocation, is a Java-based communication mechanism that permits invocation of methods from remote Java objects. CORBA, or the Common Object Request Broker Architecture, allows pieces of programs (objects) to communicate with other objects in other programs, even if the two programs have been written in different programming languages and run on different computing platforms. In CORBA, a program makes its request for objects through an Object Request Broker (ORB), and does not need to know the structure of the program from which the object comes.

The system management Java applets 420 provide system control and remote execution on the ADC device platform 100. The unit management Java applets 430 communicate with the Java system management application 320, the system management support unit 210, the ADC device platform 100 and the SNMP master agent 220. The unit management Java applets 430 are unit specific in scope and enable remote execution. Various system management Java applets 420 and unit management Java applets 430 may be loaded into the remote computing system 120 from the network HTTP server 311 and the ADC platform HTTP server 230, respectively.

For example, a system management Java applet 420 communicating through Java RMI to the Java system management application 320 displays the summary status of many ADC device platforms 100. The Java system management application 320 uses SNMP to collect summary information that is sent to the system management Java applet 420 for display. When the remote operator desires to perform system management on an individual ADC device platform 100, an ADC device's HTTP server 230 sends a unit management Java applet 430 to the browser 410 in the form of a unit management HTML, DHTML, and/or XML page 231. The unit management Java applet 430 communicates to an ADC device platform SNMP master agent 220 to perform system management functions. The ADC device platform SNMP master agent 220 uses system management support utilities to perform file transfer, application installation, and firmware upgrades. The system management support utilities communicate to the unit management Java applet 430 through a socket's layer, TCP/IP, and UDP/IP.

Figure 5:
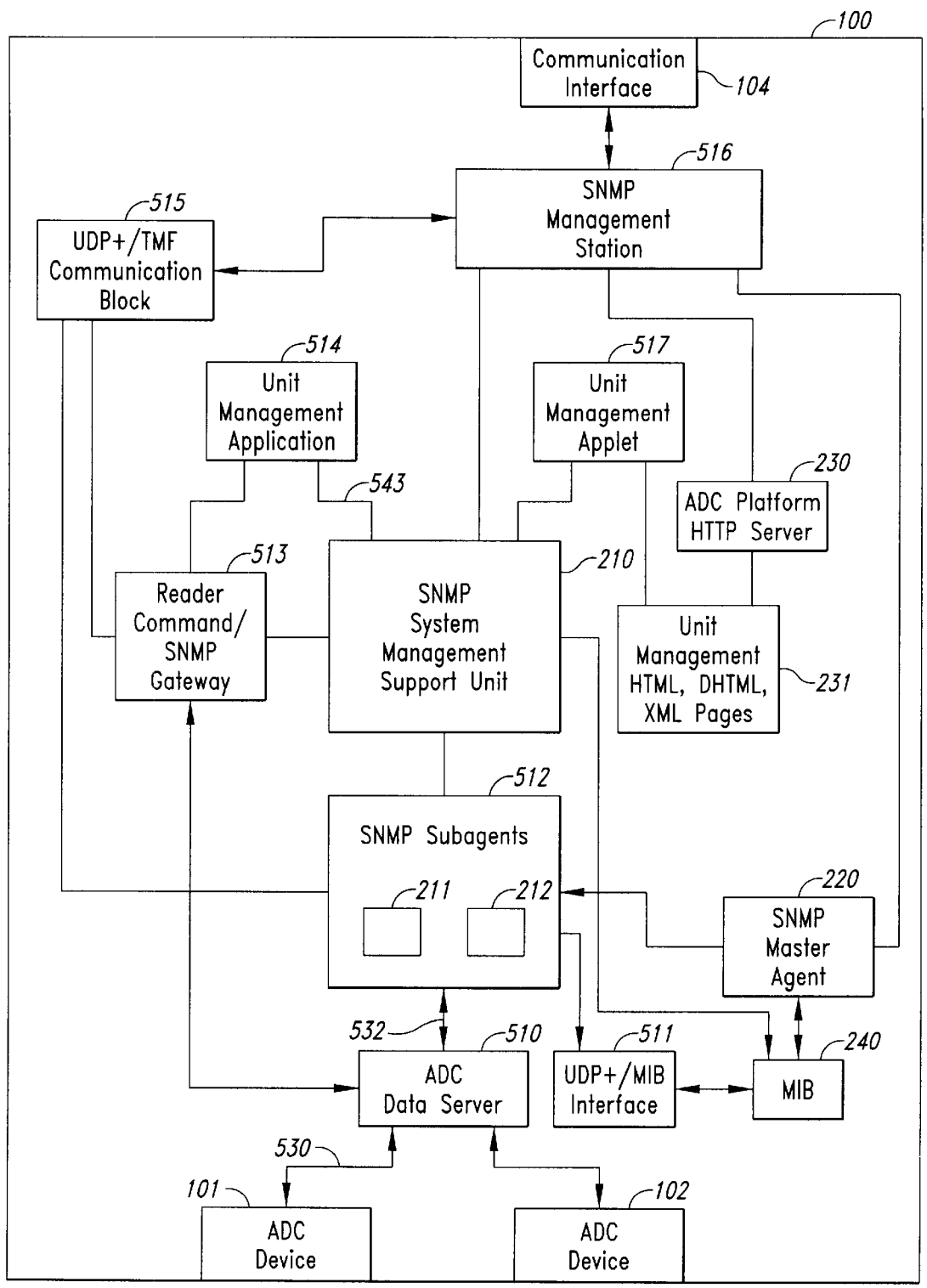
FIG. 5 illustrates the ADC device platform system management architecture for an exemplary embodiment of the invention.

FIG. 5 illustrates the ADC device platform system management architecture for an exemplary embodiment of the invention. As shown in FIG. 5, the SNMP master agent 220 communicates with the collective group of SNMP subagents 512. As previously discussed, two of the SNMP subagents are a subagent 211 for interfacing with the ADC device 101 and a subagent 212 for interfacing with the ADC device 102. The subagents 211 and 212 communicate with the ADC devices 101 and 102 through an ADC data server 510. Other SNMP subagents in the collection of SNMP 512 may also communicate to an MIB interface using TCP and UDP/IP, as shown by a communication block 511.

New SNMP subagents and upgrades to existing SNMP subagents arrive through the SNMP system management support unit 210. The system management support unit 210 provides a DLL or COM interface for the SNMP subagents 512. A DLL and COM interface, or a Dynamic-Link Library interface or Component Object Model, allows executable routines to be stored separately as files having DLL extensions that are loaded only when needed by a program, such as by an SNMP subagent. A DLL/COM routine consumes no memory until it is used. Because a DLL/COM is a separate file, a programmer may make connections or improvements to the module without effecting the operation of the calling program or any other DLL/COM routine. In addition, a programmer may use the same DLL/COM routine with other programs. According to one exemplary embodiment of the invention, the ADC device platform 100 includes DLLs/COM objects for the various ADC symbologies, such as RF tag symbologies and bar code symbologies, that may be recognized by the ADC device readers 101 and 102. As described above, the ADC device platform 100 may be equipped with a wide variety of ADC device types.

The SNMP master agent 220 resides on the ADC device platform 100 and routes all SNMP requests to SNMP subagents 512. This architecture provides flexibility to the ADC device platform 100 by allowing SNMP subagents 512 to be added and removed without effecting the other SNMP subagents or MIBs in the MIB 240. The SNMP subagents 512 extend the standard SNMP MIB and handle SNMP requests for a list of OIDs representing a particular functional area. SNMP uses the OID, or object identifier, to address specific "Set" and "Get" functions. An SNMP reader subagent, such as the SNMP subagent 211, configures and monitors reader functions, such as the ADC device 101. A system management subagent performs firmwear upgrades, application installation, back up/restore and file transfer.

The system management support unit 210 communicates with an SNMP management station 516 using the TFTP protocol. TFTP, or the Trivial File Transfer Protocol, provides a minimal implementation of the File Transfer Protocol, or FTP. Both FTP and TFTP well-known protocols for copying files between hosts. The system management station 516 implements SNMP or other protocols to interface with the communications device 104. The system management station 516 runs an SNMP management package such as HP Open View.

The SNMP subagents 512 also communicate through a UDP+/TMF protocol communications block 515 and through a UDP+/MIB interface 511. The communications block 515 then uses the UDP+/TMF protocol to communicate with the SNMP management station 516. TMF, or the Terminal Message Format protocol, may function alternatively with the UDP+ protocol, according to an embodiment of the invention. TMF is a protocol layered on top of UDP+ for 2.4 GHz systems and on top of 900 MHz drivers for 900 MHz systems. The ADC device platform 100 includes device drivers that interface with the 900 MHz radio frequency drivers and TMF. TMF routes commands and data to the appropriate service or application and performs system management in 900 MHz systems and in legacy UDP+ systems. UDP+ is configured and monitored through an SNMP subagent. The TCP, UDP/IP, and UDP+ communication stacks 515 and 511 are communication protocol stacks managed through the SNMP architecture. The protocol stacks also provide a MIB-II interface, an extension to the standard MIB.

The SNMP management support unit 210 communicates with a Reader Command/SNMP gateway 513. The Reader Command/SNMP gateway 513 routes ADC commands from the SNMP management support unit 210, allowing SNMP components to be used for 900 MHz, UDP+, and bar code systems, as well as UDP/IP networks. The Reader Command/SNMP gateway 513 controls parsing/formatting and routing reader commands. A Reader Command controls ADC devices, such as the ADC device 101, by sending commands for operations, such as turning laser scans on and off, changing reader configuration, and performing system management operations like backup and restore. Reader Commands can be received from bar code devices, 900 MHz devices, and local or remote clients. The Reader Command/SNMP gateway 513 parses these commands, translates them to OID and routes them through the SNMP management support unit 210. The SNMP management support unit 210 then dispatches these requests to the appropriate SNMP subagents for processing. If a client requests configuration data in reader command format, then the Reader Command/SNMP gateway 513 packages the configuration data for the reader command format. This architecture intentionally isolates all legacy reader command processing in a single place, simplifying maintenance of the ADC device platform 100.

Using the Reader Command/SNMP gateway 513, the SNMP management support unit 210 may transfer legacy system management commands through the Reader Command/SNMP command gateway 513 to a unit management application 514. The unit management application 514 receives legacy reader command APIs, or application programming interfaces. The SNMP management support unit 210 provides an SNMP interface to the Reader Command/SNMP gateway 513, which in turn provides a DLL interface to the unit management application 514. The Reader Command/SNMP gateway 513 may also communicate through the UDP+/TMF communication block 515 to reach the SNMP management station 516.

The ADC data server 510 provides device handlers for configuring ADC devices, such as the ADC devices 101 and 102. The ADC data server 510 may communicate with the Reader Command/SNMP gateway 513 to provide reader commands for the ADC devices. The ADC data server 510 provides reader command processing and configuration management. The ADC data server 510 notifies reader devices, such as reader devices 101 and 102, when their configuration has changed to support on-the-fly configuration changes.

As previously discussed, the HTTP server 230 runs on the ADC device platform 100 and serves up the system management Java applets to the remote HTML browser 410. The HTTP server 230 may read HTML, DHTML, and/or XML pages from the HTML, DHTML, and/or XML page unit 231. These HTML, DHTML, and/or XML pages serve up the Java applets that the HTTP server 230 then transfers through the SNMP management station 516 to the remote browser 410.

A unit management applet 517 provides the user interface for the ADC device platform 100. The unit management applet 517 uses Java or a Win32 CPL applet as its user interface. The unit management applet 517 uses Win 32 CPL for local execution only and may use Java for both local and remote execution. Win32 is the application programming interface in Windows 95 and Windows NT that enables applications to use the 32-bit instructions available on 8386 and higher processors. The Win32 CPL applet is an applet for the control panel folder.

The unit management applet 517 communicates with the HTML, DHTML, and/or XML pages 231 and may provide new HTML, DHTML, and/or XML pages or updates to HTML, DHTML, and/or XML pages or new Java applets for the HTML, DHTML, and/or XML pages 231. The unit management applet 517 communicates to the SNMP master agent 220 using an SNMP interface. The SNMP master agent 220 may transfer system management commands to the unit management applet 517. A unit management Java applet 430 and unit management application 514 provide the user interface for local and remote access. When accessed remotely, this applet is served up through the HTTP protocol in the manner previously discussed. When it is accessed locally, this applet operates as an application.

The SNMP management support unit 210 may also communicate with the unit management application 514 through an SNMP interface 543. The SNMP management support unit 210 may transfer system management commands to the unit management application 514. The SNMP management support unit 210 communicates with the SNMP management station 516 using the SNMP protocol.

As previously discussed, the unit management applet 517 provides local access to the system management functions of the ADC device platform 100. Thus, back up/restore, firmware upgrade, application installation and other functions may be provided using the same unit management Java applets used for remote access by the remote computing system 12. For UDP+ and for legacy system management applications, the terminal management format (TMF) protocol and the Reader Command/SNMP gateway 513 route configuration and system management requests to the SNMP master agent 220.

Figure 6:
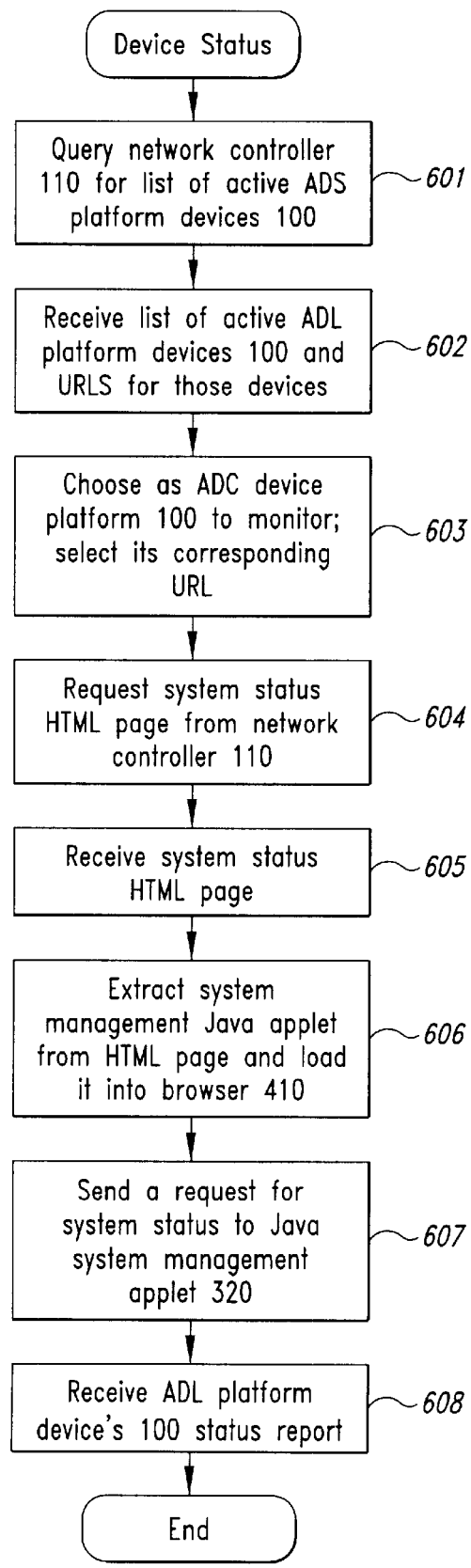
FIG. 6 provides a flowchart depicting a system monitor function that may be performed remotely on an ADC device platform by a system administrator.

FIG. 6 provides a flowchart depicting the system monitor function that may be remotely performed by a system administrator. When an ADC device platform, such as the ADC device platform 100 shown in FIG. 1, starts up, the ADC device platform sends a network broadcast for Internet Protocol (IP) discovery. This allows the Java system management application 320 on the network controller 120 to learn of newly added ADC platform devices. Conversely, when the Java system management application 320 wishes to perform IP discovery, the Java system management application 320 sends out a broadcast to the ADC device platforms 100 to find out which platforms are presently on the network. The ADC platforms 100 then respond to this broadcast with their IP addresses. A remote system administrator, such as a system administrator at the remote computer 120 of FIG. 1, may monitor the status of a given ADC device platform 100 as follows.

The remote HTML browser 410 on the remote computing system 120 queries the network controller 110 for a list of the active ADC platform devices 100 in the network controlled by the network controller 110 (step 601). The remote HTML browser 410 then receives the list of the active ADC platform devices 100 within the network and the respective URLs for those devices (step 602). The URL, or Uniform Resource Locator, is an address for a resource on the Internet. Web browsers use URLs to locate Internet resources. The URL specifies the protocol needed for accessing the resource, such as HTTP for a World Wide Web page or FTP for an FTP site, the name of the server on which the resource resides, and, optionally, the path to the resource.

The system administrator on the remote computing system 120 then selects an ADC platform device 100 to monitor. The system administrator selects the corresponding URL for the ADC device platform 100 to be monitored (step 603). The remote HTML browser 410 then requests the system status HTML page from the network controller 110 (step 604). The remote HTML browser 410 receives the system status HTML page from the network HTTP server 311 (step 605). The remote HTML browser 410 then extracts the system management Java applet for system status from the HTML page and loads it into itself (step 606).

The now active system management Java applet 420 sends a request for system status to a system management applet on the system management application 320 of the network controller 110 (step 607). The system management application 320 then sends the IP discovery ("Who's there?") message through the network to the ADC platform device platforms 100. The ADC device platforms 100 respond with an IP discovery response ("I'm here") message. The Java system management application 320 sends a request for unit status to the responding ADC device platforms 100. Each ADC device platform 100 replies with a unit status message. The Java system management application 320 then forwards all of the ADC unit status messages to the system management Java applet 420 on the remote HTML browser 410 (step 608). The Java system management applet 420 displays the system status for all of the ADC device platforms 100 on the network to the system administrator.

To receive more detailed information on ADC device platform status, the system administrator selects a system status URL on the remote HTML browser 410 that causes the network HTTP server 311 to load another system management Java applet in the HTML browser 410. This system management Java applet uses Java RMI to request system summary information to the Java system management application 320, which then requests unit status from all connected ADC device platforms 100. The Java system management application 320 receives unit status messages from the ADC device platforms 100 using SNMP and reports back to the system management Java applet using Java RMI, CORBA, or a socket interface.

Figure 7:
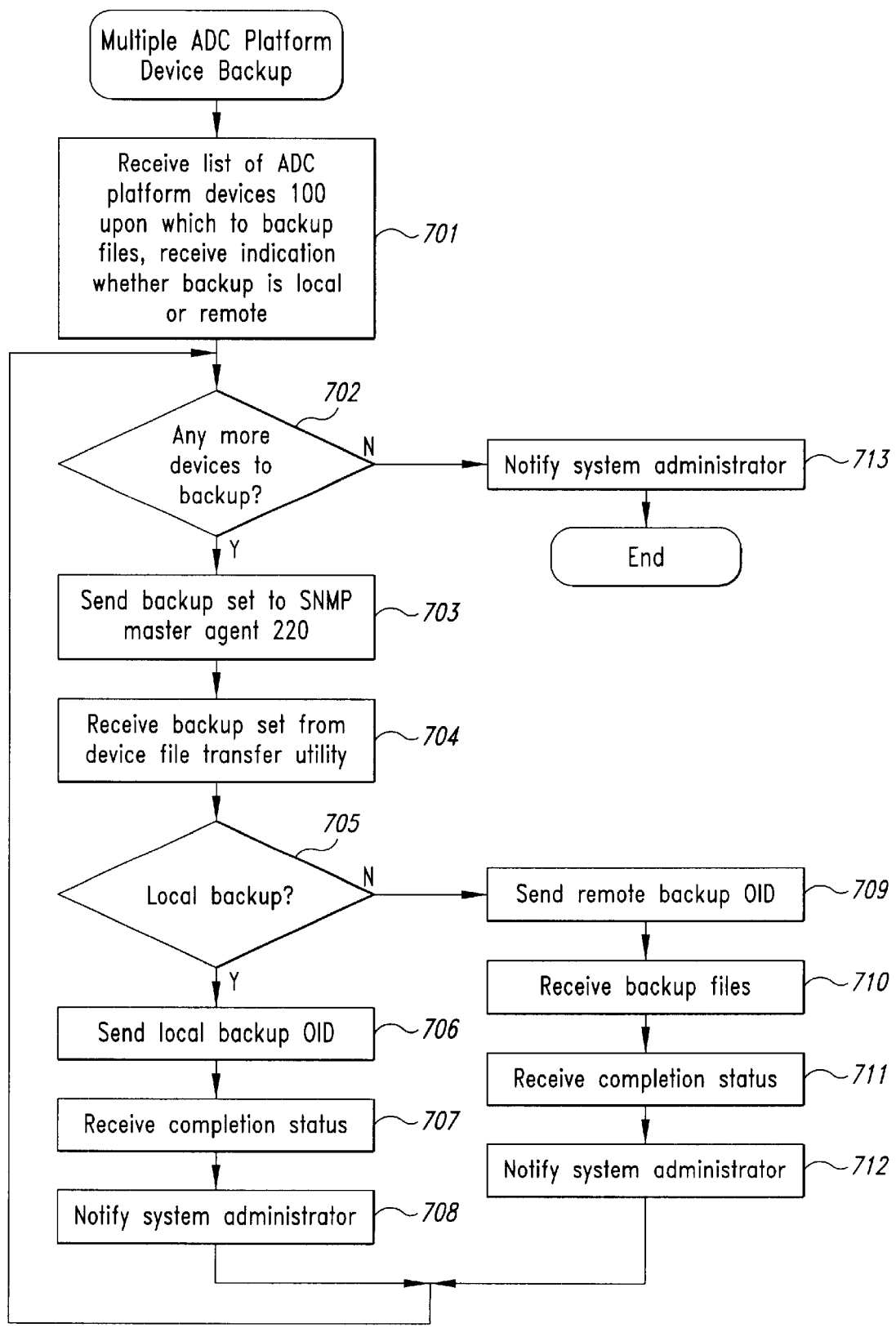
FIG. 7 provides a flowchart illustrating a back-up scenario for backing up files stored either on a network server or within the local file system of the ADC device platform, according to an exemplary embodiment of the invention.

FIG. 7 provides a flowchart illustrating a back up scenario for backing up files stored either on the network HTTP server 311 or within the local file system of the ADC device platform 100. In both cases, the system management Java applet 420 within the remote browser 410 makes a single call to the Java system management application 320 to back up data on the selected ADC device platforms 100. For each ADC device platform 100 backed up, the Java system management application 320 calls the SNMP master agent 230 to serialize the ADC device platform 100 system information, e.g., the registry and file systems. The TFTP protocol performs the transfer of back up information for remote back up files. For back up of local files, the back up information is stored directly in a local file on the ADC device platform 100.

The network HTTP server 311 receives a list of ADC platform devices 100 for which the back up file procedure has been requested, as well as an indication of whether the requested back up is local or remote (step 701). The network server determines if any remaining ADC device platforms 100 need to be backed up (step 702). If so, then the network controller sends a back-up "Set" command to the SNMP master agent 220 of the ADC device platform 100 for which back up has been requested (step 703). The SNMP master agent 220 sends a file transfer request, or a back up "Set" file, to the system management support unit 210 of the ADC device platform 100. The system management support unit 210 in turn responds or sends the back up "Set" file to the Java system management application 320 using the TFTP protocol (step 704).

If local back up has been requested (step 705), then the Java system management application 320 sends the local back up OID to the SNMP master agent 220 on the ADC platform 100 to be backed up (step 706). The SNMP master agent 220 sends a back up request to the system management support unit 210 that initiates the saving of back up records in the local file system of the ADC device platform 100. When this process has been completed, the SNMP master agent 220 sends the Java system management application 320 a back up completion status message (step 707). The Java system management application 320 then notifies the system administrator of the status of the back up request (step 708). Notification of the backup status completes the local back up procedure.

If remote back up (step 705) has been requested, then the Java system management application 320 sends the remote ADC device platform 100 a remote back up OID (step 709). The SNMP master agent 220 sends the back up request to the system management support unit 210. The system management support unit 210 sends the back up records to the Java system management application 320 using the TFTP protocol (step 710). The SNMP master agent 220 then sends the Java system management application 320 the completion status of the back up request (step 711). The Java system management application 320 notifies the remote system administrator of the status of the remote back up request (step 712). When no more ADC platform devices 100 remain to be backed up (step 702), then the Java system management application 320 provides a notification to the system administrator that all requested ADC platform devices 100 have been backed up (step 713).

Figure 8:
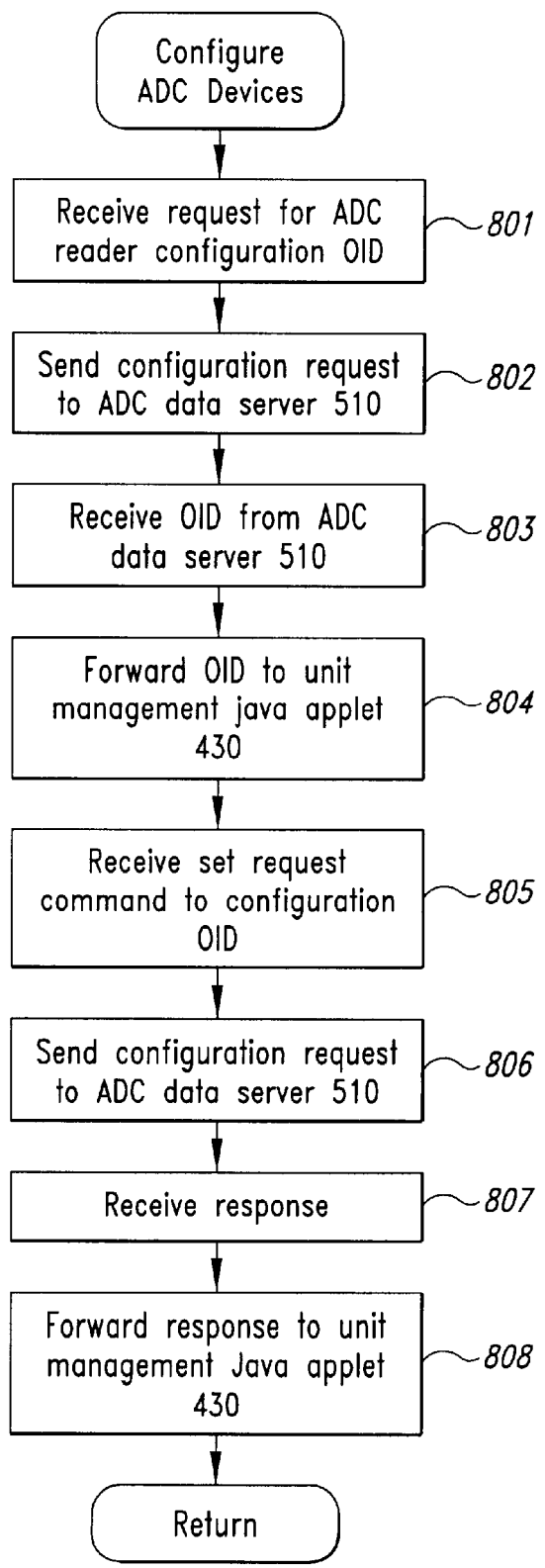
FIG. 8 provides a flowchart of the actions performed by an SNMP master agent when a remote system administrator wishes to view device characteristics on the ADC device platform and then reconfigure an ADC device on the ADC device platform, according to an exemplary embodiment of the invention.

FIG. 8 provides a flowchart of the actions performed by the SNMP master agent 220 when a remote system administrator using the remote computing system 120 wishes to view device characteristics on the ADC device platform 100 and reconfigure an ADC device on the ADC device platform 100. This procedure may be conducted either through SNMP or through TMF. While FIG. 8 illustrates the procedure using SNMP, a skilled artisan should be easily capable of developing the TMF or similar procedures.

In the SNMP scenario, the remote system administrator selects the ADC device platform 100 to view and "Sets" configuration by addressing a URL on the ADC device platform 100. The URL identifies a unit management HTML, DHTML, and/or XML page 231 that the remote HTML browser 410 loads into the unit management Java applet 430. The unit management Java applet 430 then uses SNMP "Get" and "Get/Next" commands to retrieve the reader configuration. The ADC platform device's SNMP master agent 220 receives these requests and passes them to the appropriate SNMP subagent. In the TMF scenario, an M200 controller receives unit configuration information using a TMF "Get" request. The TMF and Reader Command/SNMP gateway 513 call the SNMP master agent 220 to retrieve the appropriate configuration data.

The ADC device platform's SNMP master agent 220 receives a reader configuration OID request from the unit management Java applet 430 in the remote ADC console 122 (step 801). The SNMP master agent 220 then sends a configuration request to the ADC data server 510 (step 802). The SNMP master agent 220 receives the OID from the ADC data server 510 (step 803). The SNMP master agent 220 then forwards the OID to the unit management Java applet 430 in the remote console 122 (step 804). The unit management Java applet 430 in turn displays the configuration values to the system administrator. The system administrator sets configuration item values and forwards these selections to the unit management Java applet 430. The unit management Java applet 430 sends a "Set" request configuring the OID to the SNMP master agent 220 (step 805). The SNMP master agent 220 sends set configuration requests to the ADC data server 510. The ADC data server 510 then sends a subsystem configuration request to the appropriate ADC device. The ADC device, such as the ADC device 101, sends a configuration response to the ADC data server 510. The SNMP master agent 220 then receives a set configuration response from the ADC data server 510 (step 807). The SNMP master agent 220 forwards a return OID for the set configuration response to the unit management Java applet 430 on the remote console 122 (step 808). The unit management Java applet 430 then displays the requested configuration values to the system administrator.

Figure 9A:
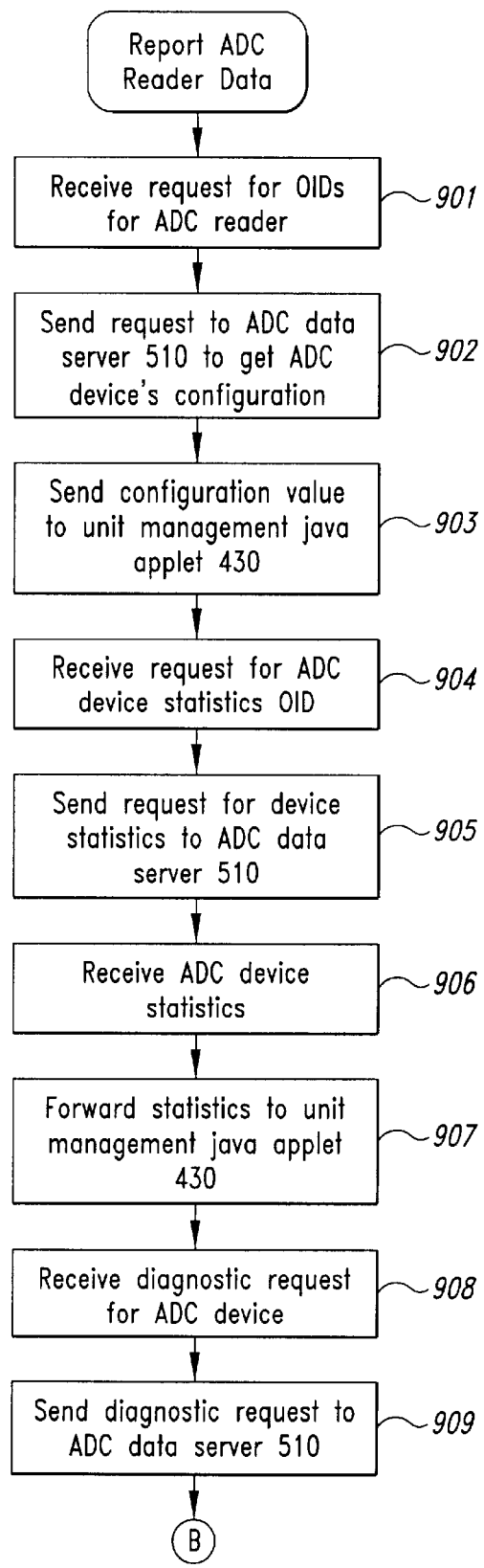
FIGS. 9A and 9B provide a flowchart illustrating the reporting of ADC reader data to the remote system administrator, according to an exemplary embodiment of the invention.
Figure 9B:
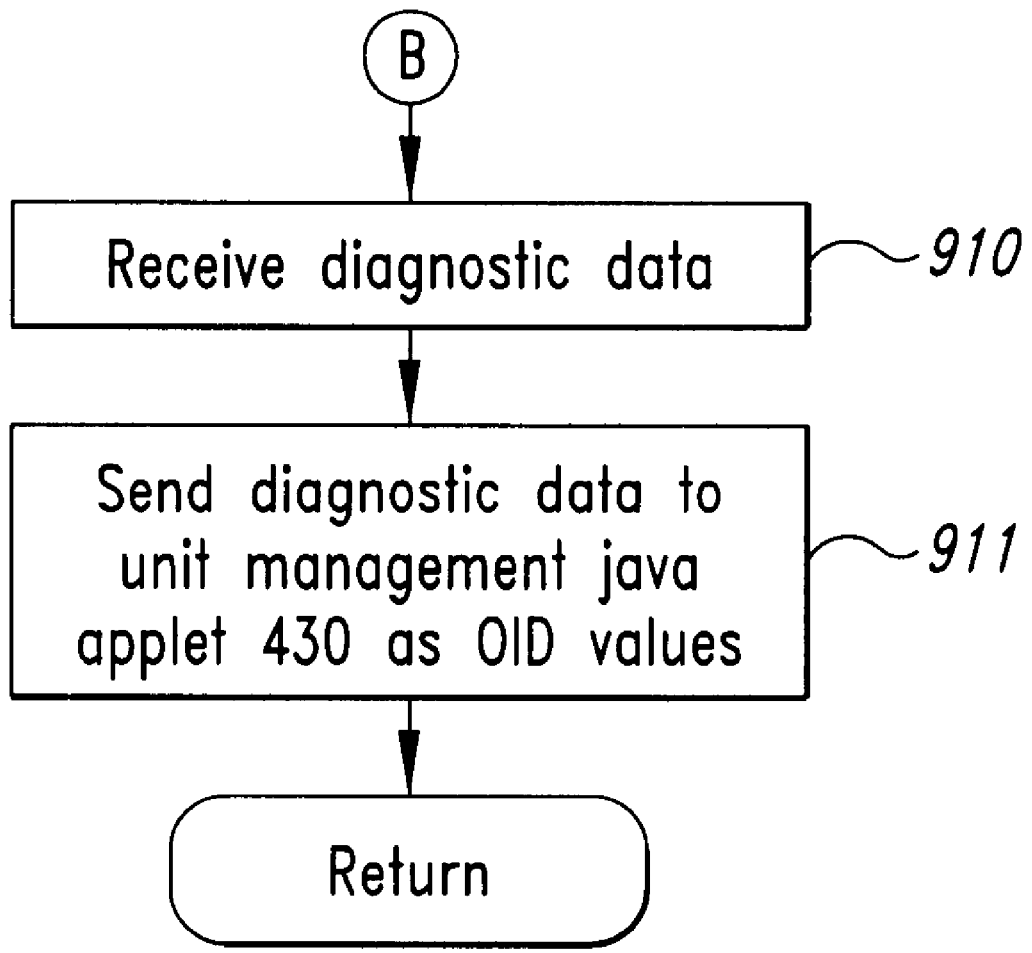

FIGS. 9A and 9B provide a flowchart illustrating the reporting of ADC reader data to the remote system administrator. These figures illustrate a scenario where the SNMP master agent 210 supervises the reporting of configuration data, statistics data from an ADC device, and ADC device platform 100 diagnostics data, and returns this data to the system administrator. In this scenario, the ADC device platform's HTTP server 230 directly serves the unit management applet up to the remote HTML browser 410. The system administrator individually selects ADC device platform 100 configuration items and ADC device statistics for viewing. The system administrator may perform remote diagnostics and view the results. An SNMP "Get" or "Set" request performs each of these functions. The diagnostics data is returned as part of the SNMP "Set" response because this is a built-in diagnostic, according to one embodiment of the invention. However, another remote diagnostic application may also be downloaded and run. The remote ADC console 122 transfers the results back to the remote computing system 122 in a file. A remote computing system using the network HTTP server 311 follows a procedure similar to that shown for this flowchart except that the network HTTP server 311 serves up the appropriate unit management Java applet 430.

The flowchart of FIGS. 9A and 9B illustrates the reporting of ADC reader data from the viewpoint of the SNMP master agent 220. The system administrator selects an ADC device platform URL and forwards it to the remote HTML browser 410. The remote HTML browser 410 requests a unit management HTML, DHTML, and/or XML page 231 from the ADC device platform's HTTP server 230. The ADC device platform's HTTP server 230 loads the appropriate unit management Java applet 430 into the remote HTML browser 410 via the selected unit management HTML, DHTML, and/or XML page 231. The system administrator then selects an ADC platform device configuration using the unit management Java applet 430. The unit management Java applet 430 sends a "Get" request for reader configuration OIDs to the SNMP master agent 220 (step 901). The SNMP master agent 220 sends a request to the ADC data server 510 to retrieve the ADC device's configuration information (step 902). The SNMP master agent 220 then returns the OID configuration value to the unit management Java applet 430 (step 903). The unit management Java applet 430 displays the configuration values to the system administrator. The system administrator selects the set of ADC device statistics of interest and sends this list to the unit management Java applet 430. The unit management Java applet 430 sends a "Get" request for the ADC statistics OID to the SNMP master agent 220 (step 904). The SNMP master agent 220 sends a "Get" statistics request to the ADC data server 510 (step 905). The ADC data server 510 sends a get statistics request to the ADC device, such as the ADC device 101, which returns the statistics to the ADC data server 510. The ADC data server 510 then sends the statistics to the SNMP master agent 220 (step 906). The SNMP master agent 220 then returns the OID for statistic values to the unit management Java applet 430 (step 907). The unit management Java applet 430 then displays the statistic values to the system administrator.

The system administrator next selects an appropriate diagnostic and provides it to the unit management Java applet 430. The unit management Java applet 430 sends a "Set" request for the diagnostic OID to the SNMP master agent 220 (step 908). The SNMP master agent 220 then requests the system management support unit 210 to run the appropriate diagnostic. The system management support unit 210 runs the diagnostic and returns diagnostic data to the SNMP master agent 220 (step 910). The SNMP master agent 220 then returns the OID values as a diagnostic status return to the unit management Java applet 430 which displays the diagnostic information for the system administrator (step 911).

Figure 10:
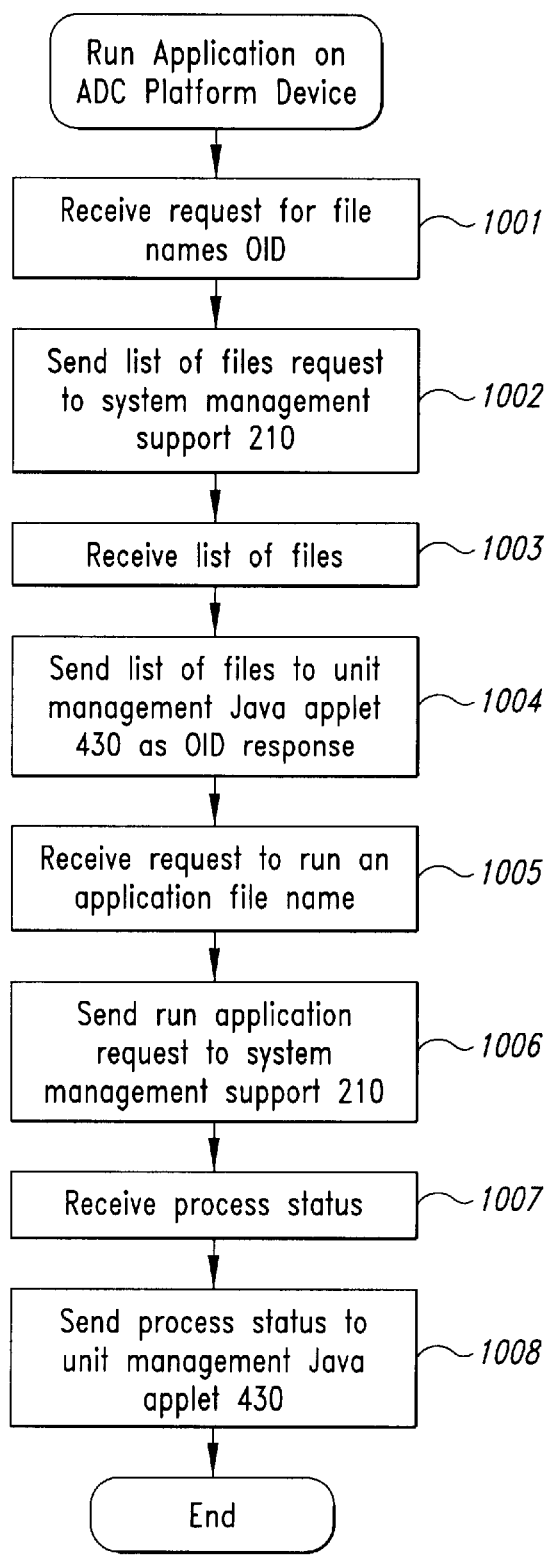
FIG. 10 provides a flowchart from the SNMP master agent's point of view of the procedure followed for running an application on an ADC device platform, according to an exemplary embodiment of the invention.

FIG. 10 provides a flowchart from the SNMP master agent's point of view of the procedure followed for running an application on an ADC device platform 100. The remote computing system 122 may run an application on the ADC device platform 100. The unit management Java applet 430 retrieves a list of application file names and forwards the list to the system administrator, who then selects a file to run. (This step may be skipped when the system administrator already knows the file name.) The unit management Java applet 430 performs an SNMP request by specifying the run application OID and including the executable file to run. The ADC device platform's SNMP master agent 220 passes the request to an appropriate SNMP subagent which forwards the request to the system management support unit 210 that calls the Win32 CreateProcess API, according to one embodiment of this invention. The CreateProcess status is passed back to the unit management Java applet 430 for display to the system administrator.

The system management functions do not directly handle subsequent communication between the just-started application and the remote ADC console 122 on the remote computing system 120. A number of techniques may be used for such communications, including sockets network communication messages passing between the remote ADC console 122 and the application and by the application writing information to a file that the remote console retrieves. A remote computing system 122 using a network HTTP server 311 follows the same scenario depicted here except that the network HTTP server 311 provides the appropriate unit management applet.

The system administrator selects an ADC device platform URL and sends it to the remote HTML browser 410. The remote HTML browser 410 requests the appropriate unit management applet from the HTTP server 230 on the selected ADC device platform 100. The ADC device platform's HTTP server 230 loads the unit management Java applet 430 in the HTML browser 410 using a unit management HTML, DHTML, and/or XML page 231. The system administrator then selects an application to run and forwards the application's identifier to the unit management Java applet 430. The unit management Java applet 430 sends the "Get" request for file names OID to the SNMP master agent 220 (step 1001). The SNMP master agent 220 in turn sends a "Get" list of files request to the system management support unit 210 (step 1002). The system management support unit 210 retrieves a file names list from the WindowsCE operating system. The system management support unit 210 then returns this list of files to the SNMP master agent 220 (step 1003). The SNMP master agent 220 sends a file list to the unit management Java applet 430 as an OID response (step 1004). The unit management Java applet 430 then displays the file list to the system administrator. The system administrator selects a file to run, and forwards the file identifier to the unit management Java applet 430. The unit management Java applet 430 then sends a "Set" request for running an application OID that includes the application file name to the SNMP master agent 220 (step 1005). The SNMP master agent 220 sends a run application request with the application file name to the system management support unit (step 1006). After sending the application file name to the WindowsCE operating system, the system management support unit 210 sends a create process status message to the SNMP master agent 220 (step 1007). The SNMP master agent 220 sends the OID response for create process status to the unit management Java applet 430 (1008). Finally, the unit management Java applet 430 sends the application run status to the system administrator.

Figure 11:
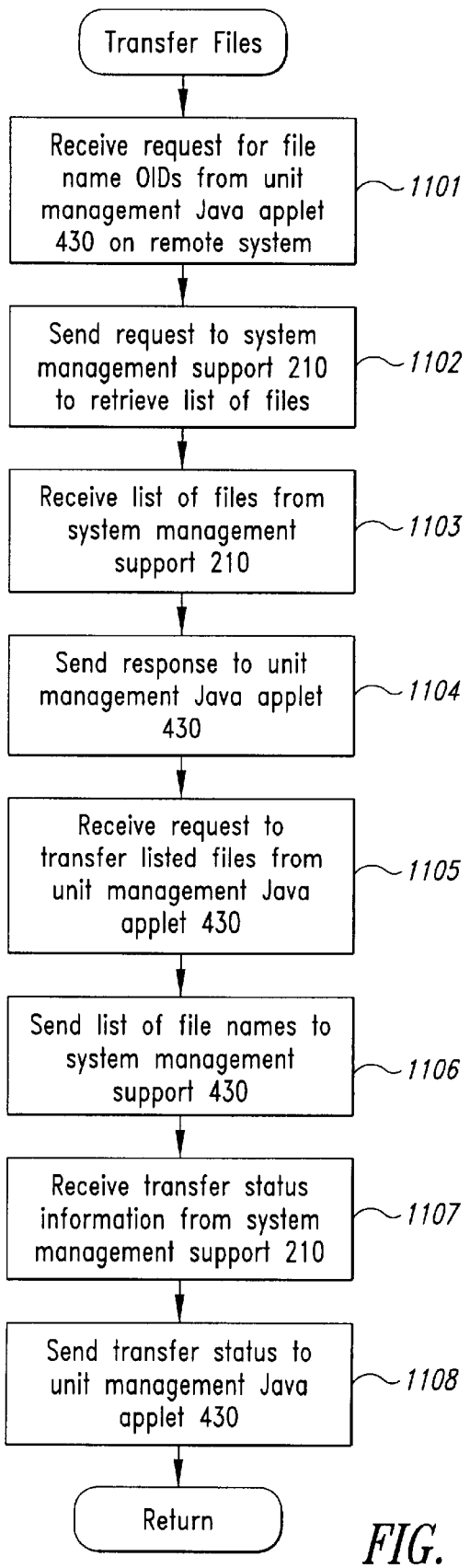
FIG. 11 provides a flowchart illustrating a file transfer procedure between a remote computing system and an ADC device platform, according to an exemplary embodiment of the invention.

FIG. 11 provides a flowchart illustrating the file transfer procedure between a remote computing system 120 and an ADC device platform 100. This flowchart shows a remote computing system 120 receiving files from a single ADC device platform 100. The scenario shows the system administrator first requesting a list of file names from the ADC device platform 100 before selecting files for transfer. The unit management Java applet 430 uses an SNMP "Get" request to pass selected file names to the ADC device platform's system management support unit 210. The system management support unit 210 reads the files from the WindowsCE operating system and writes back to the remote ADC console 122 using TFTP. The OID response passes back the status of a file transfer to the remote ADC console 122. A remote computing system 122 using the network HTTP server 311 utilizes the same scenario except that the ADC device platform's HTTP server 230 serves up the unit management applet using the network HTTP server 311, and files may be written to multiple ADC device platforms 100 at once.

The flowchart provided in FIG. 11 presents the file transfer process from the SNMP master agent's point of view. The system administrator selects an ADC device platform URL and forwards it to the remote HTML browser 410. The remote HTML browser 410 requests the appropriate unit management HTML, DHTML, and/or XML page 231 on the ADC device platform's HTTP server 230. This HTTP server 230 loads the unit management Java applet 430 from the unit management HTML page into the remote HTML browser 410. The system administrator may then requests a file display from the ADC device platform 100 and forwards this request to the unit management Java applet 430. The unit management Java applet 430 sends the "Get" request for file names OID to the SNMP master agent 220 (step 1101). The SNMP master agent 220 in turn sends a "Get" list of files request to the system management support unit 210. The system management support unit 210 sends a "Get" list of files request to the WindowsCE operating system. The WindowsCE operating system returns this file list to the system management support unit 210 which forwards the list to the SNMP master agent 220 (step 1103). The SNMP master agent 220 sends the file list as an OID response to the unit management Java applet 430 (step 1104), which displays the remote file list to the system administrator.

The system administrator selects the files to retrieve and their destination and sends this list to the unit management Java applet 430. The unit management Java applet 430 in turn sends a "Set" request for "get files OED" (the file names) to the SNMP master agent 220 (step 1105). The SNMP master agent 220 sends a transfer file request including the file names to the system management support unit 210 (step 1106). The system management support unit 210 then sends a read file command to the WindowsCE operating system. The system management support unit 210 then transfers the files to the unit management Java applet 430 using the TFTP protocol. The SNMP master agent 220 sends an OID response for file transfer status to the unit management Java applet 430 (step 1108). The unit management Java applet 430 then forwards the file transfer status to the system administrator.

Figure 12:
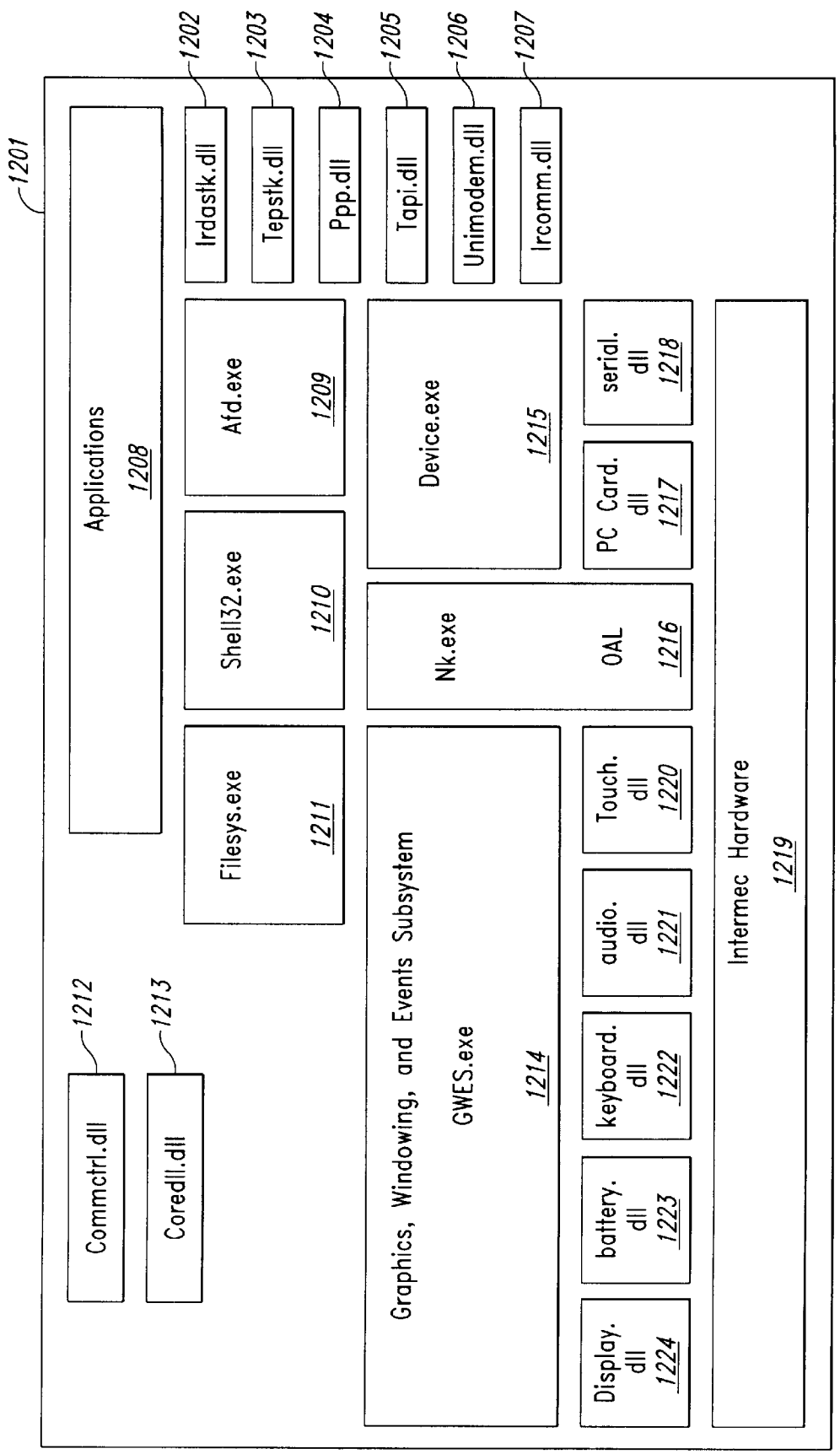
FIG. 12 depicts an ADC device platform's operating system architecture and the relationship between the different modules of the operating system.

FIG. 12 shows the ADC device platform's operating system architecture and the relationship between the different modules within the operating system. The ADC platform device 100 contains both FLASH and RAM memory (not shown), with RAM maintained by a backup battery. The FLASH memory contains the system executables, DLLs, manufacturer proprietary applications, bundled applications, and other miscellaneous files (such as fonts, audio, and bitmaps). For system executables and DLLs, code and read-only sections are uncompressed for execution from FLASH while the read/write sections are compressed because these sections are copied into RAM for operation. The miscellaneous files are typically compressed, with the exception of a few font files.

The RAM comprises two parts, a storage memory and a program memory. The storage memory contains the registry and file system. The registry is a central hierarchical database that includes information needed for configuring the ADC device platform 100 computing system for one or more users, applications, and hardware devices. The registry contains information continually referenced by the operating system during operation, such as profiles for each user and applications installed in the computing system. The file system contains the application and data files installed or created by the user. All files in the file system are always compressed, according to one embodiment of the invention. The operating system and running applications use the program memory. The user may adjust the division of RAM into storage and program memory at any time. A recommended default setting initially divides the RAM in half, giving fifty percent to storage and fifty percent to program memory.

The WindowsCE operating system manages bundled and user applications differently. A bundled application's code executes directly from FLASH. A user-installed application resides compressed in the file system, so its code and data must be uncompressed and copied into the program memory for execution. Since WindowsCE provides on-demand paging, the WindowsCE operating system only needs to uncompress and copy a small portion of a user-installed application into RAM for execution. An entire executable or DLL file may also be compressed in FLASH. When a compressed executable runs, the on-demand paging uncompresses required pages and loads them into RAM.

As shown in FIG. 12 the operating system architecture includes DLLs for a display 1224, a battery 1223, a keyboard 1222, an audio system 1221, touch-sensitive controls 1220, a PC card 1217, a serial connection interface 1218, infrared communications support 1202, TCP software development kit (SDK) 1203, a Point-to-Point Protocol (PPP) 1204, a telephony API (TAPI) 1205, universal modem support 1201, Infrared (IR) communication 1207, communications control 1212, and a core DLL 1213. The operating system also includes applications 1208 and Intermec hardware 1219. Executable files included in the operating system include a file system 1211, a shell for Win 32 1210, a Fixed Disk (FD) file 1209, device executables 1215, OAL 1216, and graphics windowing and events subsystem 1214.

Figure 13:
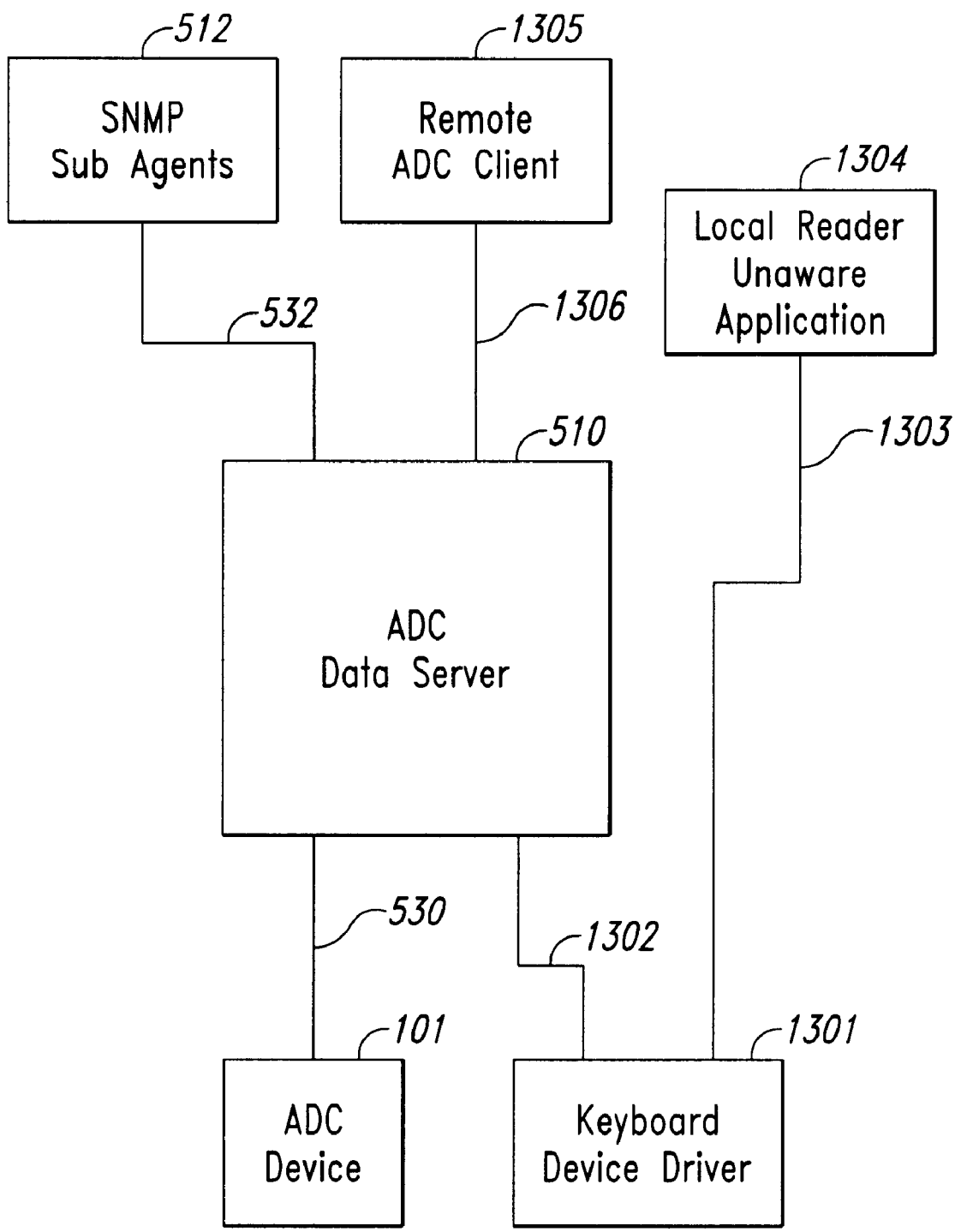
FIG. 13 illustrates additional detail for an embodiment of the ADC data server.

FIG. 13 provides additional detail for the ADC data server 510. The ADC data server 510 provides multiple local or remote clients with access to multiple ADC devices, such as the ADC device 101. The ADC data server 510 manages multiple and local automatic data collection applications, collects, filters and distributes ADC data from multiple ADC devices to multiple clients, performs reader commands, and performs virtual wedging. The ADC data server 510 allows multiple clients to access multiple devices without burdening these client applications with an understanding of the low level ADC protocols or how to share the ADC devices. The device drivers encapsulate all device management, which simplifies adding a new ADC device to the ADC device platform.

As previously discussed, the ADC data server 510 communicates with ADC devices such as the ADC device 101. Such communications typically occur over serial interface 530. The ADC data server 510 may also communicate with a keyboard device driver 1301 through a proprietary interface 1302. In one embodiment of the invention, the keyboard device driver 1301 is a WindowsCE device driver that sends keyboard data to the application presently in focus on the ADC device platform 100. The keyboard device driver 1301 may also transfer data to a local reader unaware application 1304. The local reader unaware application 1304 is so named because the application does not know that it is receiving data from an ADC device, such as barcode data input. Communications between the keyboard device driver 1301 and the local reader unaware application 1304 pass through the standard WindowsCE application key interface.

The ADC data server 510 communicates with the SNMP subagents 512 through the DLL interface 532. The ADC data server 510 also communicates with a remote ADC client 1305 through a socket interface 1306. The remote ADC client 1305 may be a custom ADC application that runs on a remote host such as the remote HTML browser 410. In one exemplary embodiment, all networked ADC clients communicate with the ADC data server 510 using the Winsock 1.1 socket's interface over TCP/IP. The ADC data server 510 supports all physical communication methods provided by TCP/IP, such as serial communication and Infrared Data Association (IRDA) standard communication. After a successful connection, the ADC data server 510 dedicates resources to handle all communications to the client application, ensuring that communication problems with one client will not affect other network clients.

According to one embodiment, the communication scheme provides a variable length, packet message base. The client, such as an SNMP subagent, performs a first read to determine the message length. The client then allocates a sufficiently large buffer to hold the response and performs a second read to retrieve the rest of the message. Since WindowsCE provides only a limited number of socket connections, the maximum number of remote clients is also limited, according to one embodiment of the invention.

If communication errors occur while the ADC data server 510 communicates with a client, the ADC data server 510 retries to establish communication before closing the connection. After closing the connection, the ADC data server 510 maintains the client data and resources for a user-configurable time period so that the client may reconnect to the ADC data server 510. This reconnect time out is configurable by the user. After the reconnect time out, the ADC data server discards all data resources for that client. The ADC data server 510 uses a "no activity time out" to control client communications when the ADC data server 510 pings clients for which there has been no recent activity. For clients that fail to respond, the ADC data server 510 enters a communication "retry" mode as it does in a connection mode.

Local ADC device platform applications use the manufacturer's software development kit (SDK), or the ADC data server 510 API dynamic link library (DLL), to collect ADC data. Local applications may also use the sockets interface. The DLL interface optimizes performance and resource overhead. Since WindowsCE provides a limited number of sockets, this embodiment allows those sockets for all remote clients or unit management's usage.

The ADC data server 510 architecture allows ADC data to be received from ADC devices such as bar-code input devices, RFID interrogators and microlink devices. For each supported ADC device, such as the ADC device 101, there is a specific ADC device protocol handler for a device driver. The ADC device protocol handler hides the specific protocol from the ADC clients simplifying addition of new ADC devices.

The ADC data server 510 supports an SNMP ADC group MIB in cooperation with the ADC devices such as the ADC devices 101 and 102. A Reader Group MIB provides ADC device configuration, reporting ADC device statistics and running end device diagnostics. MIB subgroups support the Reader Group MIB for each end device and for the ADC data server itself.

Figure 14:
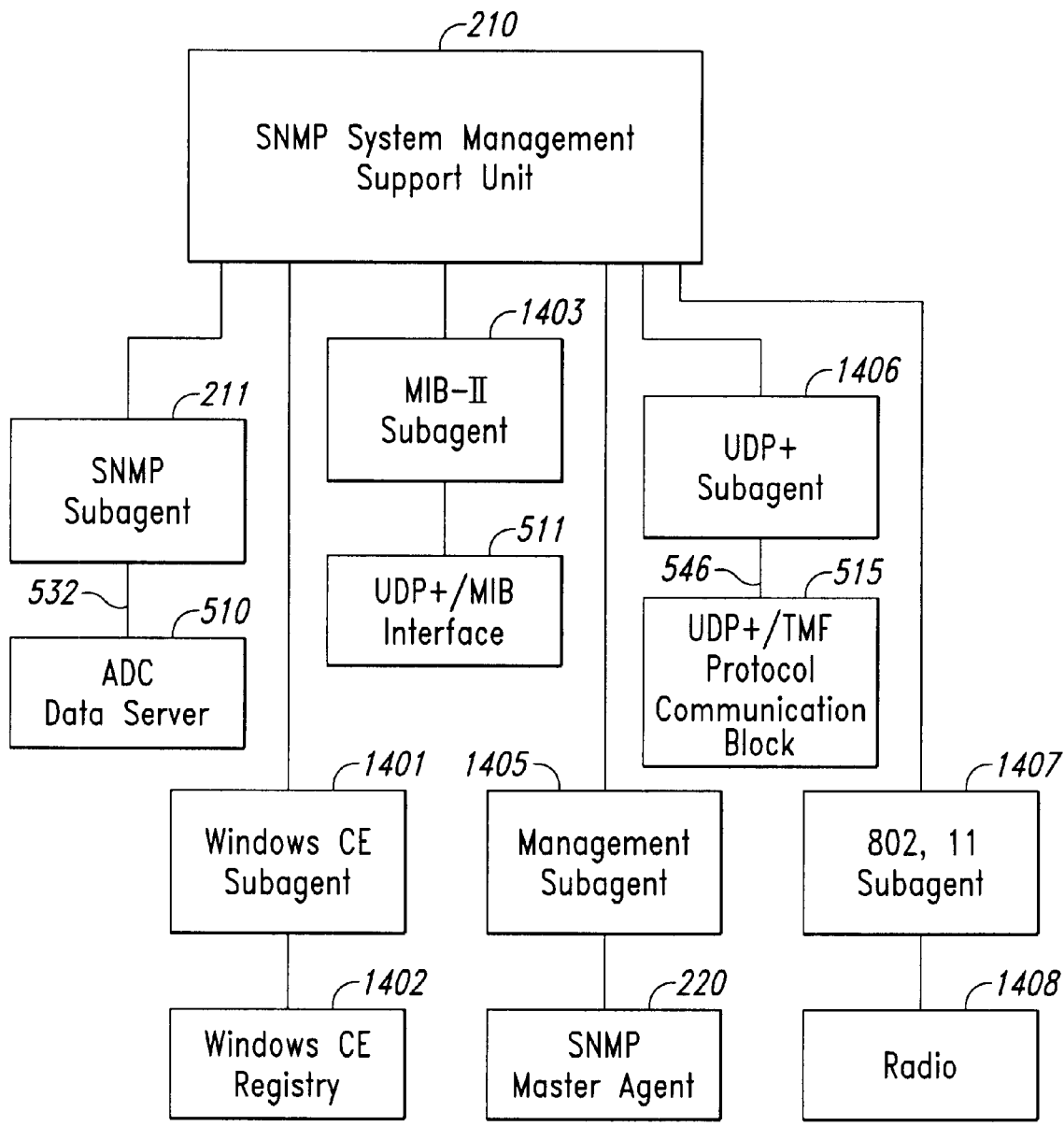
FIG. 14 illustrates additional detail for an embodiment of the SNMP master agent and the SNMP subagents.

FIG. 14 provides additional detail for the SNMP master agent 220 and the SNMP subagents. The ADC device platform SNMP architecture uses a master/sub agent concept. The SNMP master agent 220 receives incoming SNMP requests and routes them to the appropriate SNMP subagents for processing. The SNMP subagents respond to the SNMP master agent 220 which in turn formats the SNMP response. According to one embodiment of the invention, the ADC device platform 100 has SNMP subagents for: bar-code reader configuration; control, diagnostic and statistics; system management; UDP+; 802.11 MIB, and WindowsCE. Each of these SNMP subagents communicates with a ADC device platform 100 subsystem in order to satisfy most SNMP requests.

The manufacturer-provided interfaces remove all requirements for knowing SNMP and the communications protocols by the designers of new SNMP subagents. A programmer writing an SNMP subagent simply provides a list of OIDs, a table of OIDs, and corresponding routines to handle the SNMP requests. All SNMP style formatting and communications will be hidden from the user. When this subsystem is initialized, it simply calls the SNMP subagent Register( ) interface to tell the SNMP master agent 220 it is available to accept certain OIDs. When the subsystem is deactivated, it uses the UnRegister( ) interface to inform the SNMP master agent 220 that it will no longer accept SNMP requests. When an ADC device platform 100 subsystem needs to send a notification of an extraordinary event, an SNMP trap may be generated and sent to an SNMP management console.

The Register( ) interface tells the SNMP master agent 220 which subagents should receive SNMP requests. The Register( ) interface registers an SNMP subagent with the SNMP master agent, passing an OID tree that the SNMP subagent will receive. When an SNMP request comes into the SNMP master agent 220, it checks the OIDs in the request and routes them to the proper SNMP subagent for processing. The SNMP subagent examines its OID/routine table to locate which subroutine to call in order to satisfy the SNMP request. Upon calling the Register( ) method, a thread will be spawned to handle SNMP processing. The calling process requires no knowledge of the subagent handling the processing. A thread is a process that is part of a larger process or program.

As previously discussed, the ADC subagent 211 communicates to the ADC data server 510 through a DLL interface. The ADC subagent 211 controls ADC devices such as a bar-code reader and provides configuration controlled diagnostics and statistics for the ADC device.

The SNMP master agent 220 also communicates with a WindowsCE subagent 1401 that communicates with WindowsCE registry 1402. The WindowsCE subagent 1401 provides access to the WindowsCE registry, file system, and processes. A MIB-II subagent 1403 provides communication with the TCP/IP communications stack 511. The SNMP master agent 220 also communicates with a management subagent 1405 which in turn communicates with the system management support unit 220 through a standard MIB-II interface. The management subagent 1405 provides functions such as file transfer and firmware upgrades. The system management support unit 220 provides the TFTP client, application installation utility, file system utility, system upgrade utility, and backup/restore utility. The SNMP master agent 220 also communicates with a UDP+ subagent 1406, which in turn communicates with the UDP+ communications stack 515. The SNMP master agent 220 also communicates with an 802.11 subagent 1407 which communicates with a radio 1408.

Figure 15:
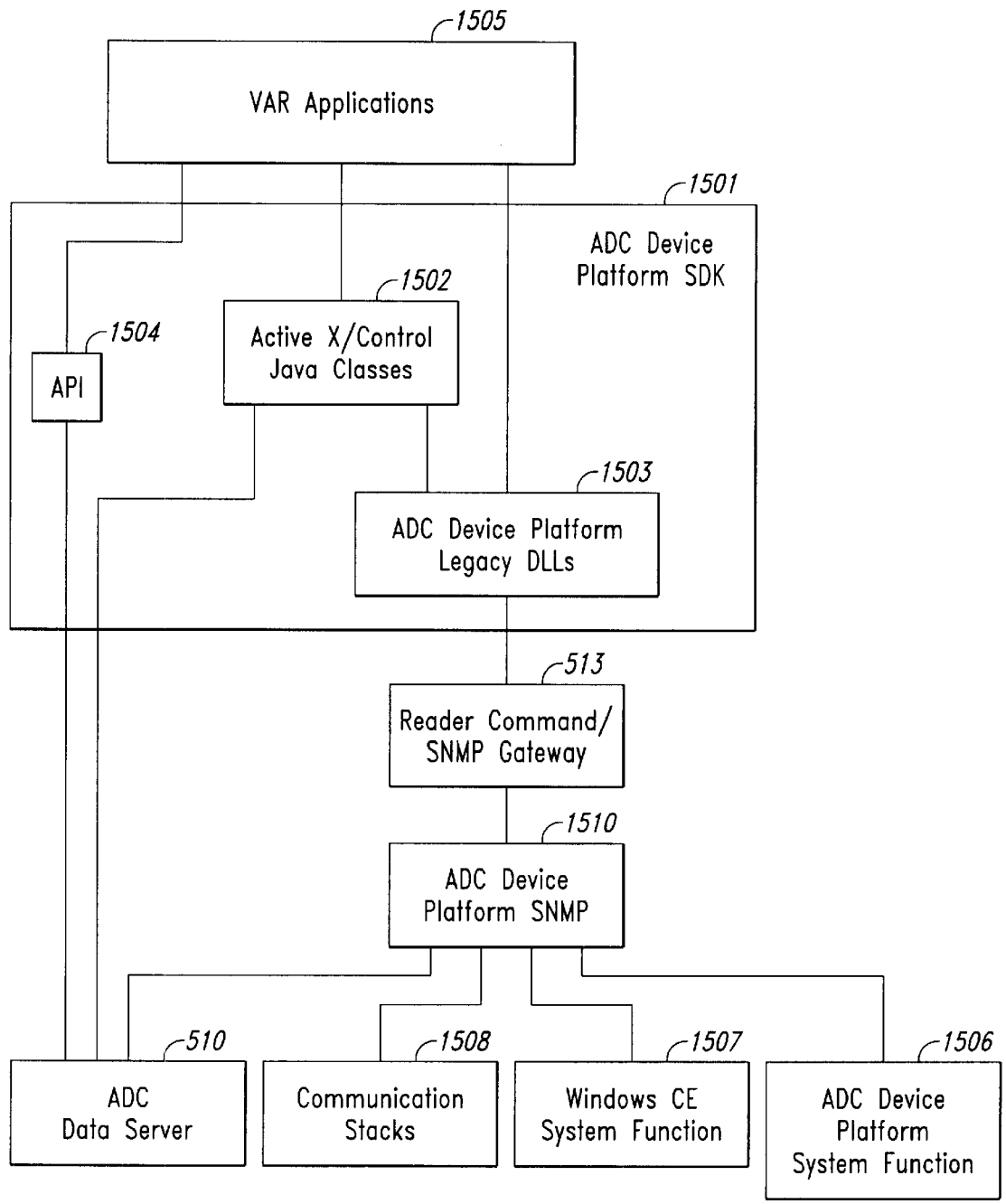
FIG. 15 illustrates the ADC device platform's software development kit (SDK).

FIG. 15 illustrates the ADC device platform 100 software development kit (SDK). The ADC device platform 100 SDK provides the software components that allows applications to access ADC device platform 100 components such as the ADC data server 510. The ADC device platform 100 SDK is compatible with WindowsCE and Win32 programming environments. The ADC device platform 100 SDK allows programmers to write seamless ADC device platform 100 applications in a Win32 programming environment and debug the applications before executing then on the ADC device platform 100.

In one exemplary embodiment, the ADC device platform 100 SDK supports the following programming components: Visual C/C++, Microsoft Foundation Class (MFC), Visual Basic, and Java. As shown in FIG. 15, the ADC device platform SDK 1501 includes Active X control/Java classes 1502, ADC device platform legacy DLLs 1503, and the ADC data server API 1504. The ADC device platform 100 legacy DLLs provide legacy interfaces that tie together system components. Both the Active X control/Java classes 1502 and the ADC device platform legacy DLL 1503 may operate in connection with value-added (VAR) reseller applications 1505. For example, the VAR applications 1505 may provide data collection and unit management applications. The Active X control/Java classes 1502 may communicate with the VAR application 1505 using Active X and Java APIs. The ADC device platform DLL communicates with the VAR applications 1505 through legacy APIs, such as a DLL interface, in one exemplary embodiment. The ADC device platform legacy DLLs 1503 use legacy reader commands to communicate with the Reader Command/SNMP gateway 513. The Reader Command/SNMP gateway 513 in turn uses legacy management commands or an SNMP interface to communicate with an ADC device platform SNMP 1510 that includes the SNMP master agent 220 and SNMP subagents. The ADC device platform SNMP communicates with the ADC data server 510, communication stacks 1508, WindowsCE system functions 1507, and ADC device platform system functions 1506.

The ADC data server 510 provides ADC data and reader configuration and control. The ADC device platform SNMP 1510 communicates to the ADC data server through the ADC configuration DLL interface. The communication stacks 1508 include the communication stacks for TCP/IP, UDP+, and 900 MHz. The WindowsCE system functions 1507 include registry access and standard serial driver configuration, among other functions. The ADC device platform system functions 1506 include the ADC device platform program module display, and keyboard configuration.

The ADC data server 510 may also communicate with the VAR application 1505 through the ADC data server API 1504, which is a DLL interface used for data collection. The ADC data server 1509 also communicates with the Active X control/Java classes 1502 through the ADC data server API.

FIG. 16 displays the ADC device platform communication protocol stack. Data communications systems contain a communications stack for transferring data between computers such as between the ADC device platform 100 and the remote computing system 120. Each computer typically has a communications stack containing a number of layers. For example, the open systems interconnect (OSI) communications stack defined by the International Standards Organization consists of seven layers. The layers form a sequence from a lowest layer (or bottom layer) to the highest layer (or top layer). The layers divide the processing necessary for communicating between computers into discrete units. The bottom layer in the communications stack typically interacts with the physical medium used for transferring the data, such as coaxial cables. The top layer of the communications stack provides services to application programs, and the middle layers of the communications stack typically are responsible for routing and maintaining a connection. A local computer transfers data to a remote computer when an application program first passes the data to the top layer of the communications stack of the local computer. The top layer then processes the data and sends the data to the next lowest layer in the communications stack. Thereafter, each layer in turn processes the data until the data reaches the bottom layer, where the data is sent to the remote computer over the transfer medium. The bottom layer of the communications stack of the remote computer receives the data from the transfer medium and passes the data up the communications stack. Each layer performs its specific processing on the data until the data reaches the top layer. The top layer processes the data and sends the data to an application program. A comstack manager typically starts the communication stack and maintains it stack during its lifetime.

In one exemplary embodiment, the communication stack of the ADC device platform 100 utilizes a seven-layered communication protocol, include an application layer 1601, a presentation layer 1602, a session layer 1603, a transport layer 1604, a network layer 1605, a data link layer 1607 and a physical layer 1608. Included in the application layers 1601 are ADC device platform applications 1609, the Winsock 1.1 API, and additions for legacy applications 1610. The presentation layer 1602 and session layer 1603 include the TMF and UDP+ protocols 515, the TFTP protocol 1611 and the SNMP master agent 220. TCP 1612 is included in the application 1601, the presentation layer 1602, the session layer 1603, the transport layer 1604, and the network layer 1605. The UDP layer 1613 resides primarily in the transport layer 1604. IP, ICMP, and ARP 1615 reside within the network layer 1605. In all other respects, the ADC device platform communications stack operates in a manner similar to that described above, according to one embodiment of the invention.

The ADC device platform of the invention may be applied in connection with systems and methods for more accurate bar code scanning. Such a system is more clearly described in a patent application entitled "Method for Decoding Bar Code Symbols by Declaring Erasures of Element Widths Based on Soft Decision of Measured Widths," U.S. application Ser. No. 09/007,227, filed on Jan. 14, 1998, and assigned to a common assignee, which is hereby incorporated by reference.

The ADC device platform of the invention may also be applied in conjunction with improved scanning devices and procedures. One applicable approach is more clearly described in a patent application entitled "Method of Auto-discriminating in Symbology Reader Employing Prioritized and Updated Table of Symbologies," U.S. application No. 09/006,693 filed on Jan. 14, 1998now U.S. Pat. No. 5,969,326, and assigned to a common assignee, which is hereby incorporated by reference.

Although specific embodiments of, and examples for, the invention are described herein for illustrative purposes, various equivalent modifications are possible within the scope of the invention, as will be recognized by those skilled in the relevant art. The teachings provided herein of the invention can be applied to other data symbol imaging systems, not necessarily the exemplary ADC device platform having ADC devices described above. Various exemplary data symbol enablement systems, and accordingly, various other device input and output enablement systems can be employed under the invention. While the invention focuses on bar code symbologies, the invention can similarly read visual indicia of other stored images. The ADC device platform may operate with protocols and languages in addition to those specifically disclosed herein. For example, the ADC device platform is not limited to operations using HTTP, HTML, DHTML, XML, UDP, TCP/IP, FTP, SNMP, and TFTP but is equally applicable to other similar languages and protocols. For example, the remote HTML browser may read and receive pages in HTML, DHTML, XML, and any other similar language.

Aspects of the invention can be applied to not only reading machine-readable symbols and other images, but also to transmitting such images to external devices, such as computerized servers and printers. For example, in an alternative embodiment, the invention aids a device operator in determining that some aspect of an external connection between the ADC device platform and a remote computer has failed or is otherwise not enabled. Thus, the invention finds broad applicability in aiding and instructing a device operator in performing virtually any non-enabled operations which may be performed with a ADC device platform, a data collection terminal, and a data symbol imaging system.

The embodiments of the invention disclosed hereinabove have been discussed primarily with regard to hand-hand devices, such as hand-held data collection terminals. However, the invention finds equal applicability in stationary data collection terminals, such as a permanently mounted device, and in desktop personal computers.

All of the above U.S. patents and applications are incorporated herein by reference as if set forth in their entirety.

These and other changes can be made to the invention in light of the above detailed description. In general, in the following claims, the terms used should not be construed to limit the invention to the specific embodiments disclosed in the specification and the claims, but should be construed to include all ADC device platforms, data collection terminals, and data symbol imaging systems that operate under the claims set forth hereinbelow. Accordingly, the invention is not limited by the disclosure, but instead its scope is to be determined entirely by the following claims.

What is claimed is:

1. A system for controlling a plurality of hand-held devices having at least one automatic data collection reader, comprising:

a remote computing system having a modem and a browser that receives Hypertext Markup Language (HTML) documents, Dynamic Hypertext Mark-Up Language (DHTML) documents, and Exstensible Mark Up Language (XML) documents over the World Wide Web;

for each hand-held device of the plurality of hand-held devices:

a Simple Network Management Protocol (SNMP) master agent that communicates with the remote computing system;

a Hypertext Transfer Protocol (HTTP) server that receives document queries from the browser of the remote computing system and sends HTML documents, DHTML documents, and XML documents to the remote computing system over the World Wide Web;

a first translator that translates SNMP-formatted data sent from the SNMP master agent to the at least one automatic data collection reader into a format suitable for reception by the at least one automatic data collection reader; and a second translator that translates data received from the at least one automatic data collection reader into the SNMP format for transmission to the remote computing system.

2. The system of claim 1 wherein the HTML documents, DHTML documents, and XML documents sent by the HTTP server of a hand-held device of the plurality of hand-held devices to the remote computing system include application programs that provide the browser with a capability for performing data transactions on the hand-held device of the plurality of hand-held devices.

3. The system of claim 1 wherein the hand-held device communicates with the remote computing system using the TCP protocol.

4. The system of claim 1 wherein the hand-held device communicates with the remote computing system using the UDP/IP protocol.

5. The system of claim 1 wherein the hand-held device communicates with the remote computing system using the UDP+ protocol.

6. The system of claim 1 wherein communications from at least one hand-held device of the plurality of hand-held devices passes through a wireless communications system en route to the remote computing system.

* * * * *